United States Patent
Brannon

(10) Patent No.: US 10,798,076 B2
(45) Date of Patent: *Oct. 6, 2020

(54) SECURELY AUTHORIZING ACCESS TO REMOTE RESOURCES

(71) Applicant: AirWatch, LLC, Atlanta, GA (US)

(72) Inventor: Jonathan Blake Brannon, Mableton, GA (US)

(73) Assignee: AirWatch, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/377,290

(22) Filed: Apr. 8, 2019

(65) Prior Publication Data

US 2019/0238526 A1   Aug. 1, 2019

Related U.S. Application Data

(63) Continuation of application No. 15/708,136, filed on Sep. 19, 2017, now Pat. No. 10,257,180, which is a
(Continued)

(51) Int. Cl.
*H04L 29/06* (2006.01)
*H04W 12/08* (2009.01)

(52) U.S. Cl.
CPC ............ *H04L 63/062* (2013.01); *H04L 63/08* (2013.01); *H04L 63/0823* (2013.01);
(Continued)

(58) Field of Classification Search
CPC ..... H04L 63/08; H04L 63/10; H04L 63/0823; H04L 63/062; H04L 63/102; H04L 63/0892; H04W 12/08; H04W 12/0808
See application file for complete search history.

(56) References Cited

U.S. PATENT DOCUMENTS

| 5,864,683 A | 1/1999 | Boebert |
| 5,928,329 A | 7/1999 | Clark |
(Continued)

FOREIGN PATENT DOCUMENTS

| JP | H08-190529 | 7/1996 |
| JP | 2005346183 | 12/2005 |
(Continued)

OTHER PUBLICATIONS

Notification of Reasons for Rejection dated Jan. 30, 2018 for Japanese Application No. 2016-543940 (Translation provided).
(Continued)

*Primary Examiner* — Matthew Smithers
(74) *Attorney, Agent, or Firm* — Clayton, McKay & Bailey, PC

(57) ABSTRACT

Methods and an apparatus are provided for securely authorizing access to remote resources. For example, a method is provided that includes receiving a request to determine whether a user device communicatively coupled to a resource server is authorized to access at least one resource hosted by the resource server and determining whether the user device communicatively coupled to the resource server is authorized to access the at least one resource hosted by the resource server based at least in part on whether the user device communicatively coupled to the resource server has been issued a management identifier. The method further includes providing a response indicating that the user device communicatively coupled to the resource server is authorized to access the at least one resource hosted by the resource server in response to a determination that the user device communicatively coupled to the resource server is authorized to access the at least one resource hosted by the resource server. The method yet further includes providing a response indicating that the user device communicatively (Continued)

coupled to the resource server is not authorized to access the at least one resource hosted by the resource server in response to a determination that the user device communicatively coupled to the resource server is not authorized to access the at least one resource hosted by the resource server.

20 Claims, 9 Drawing Sheets

Related U.S. Application Data continuation of application No. 14/927,504, filed on Oct. 30, 2015, now Pat. No. 9,769,141, which is a continuation of application No. 14/033,682, filed on Sep. 23, 2013, now Pat. No. 9,185,099.

(52) U.S. Cl.
CPC ............ *H04L 63/10* (2013.01); *H04L 63/102* (2013.01); *H04W 12/0808* (2019.01); *H04L 63/0892* (2013.01)

(56) References Cited

U.S. PATENT DOCUMENTS

| | | | |
|---|---|---|---|
| 5,961,590 A | 10/1999 | Mendez | |
| 5,974,238 A | 10/1999 | Chase, Jr. | |
| 6,023,708 A | 2/2000 | Mendez | |
| 6,049,670 A | 4/2000 | Okada | |
| 6,269,369 B1 | 7/2001 | Robertson | |
| 6,463,470 B1 | 10/2002 | Mohaban | |
| 6,606,662 B2 | 8/2003 | Nagasaki | |
| 6,708,221 B1 | 3/2004 | Mendez | |
| 7,225,231 B2 | 5/2007 | Mendez | |
| 7,284,045 B1 | 10/2007 | Marl | |
| 7,363,349 B2 | 4/2008 | Friedman | |
| 7,363,361 B2 | 4/2008 | Tewari | |
| 7,444,375 B2 | 10/2008 | McConnell | |
| 7,447,799 B2 | 11/2008 | Kushner | |
| 7,475,152 B2 | 1/2009 | Chan | |
| 7,660,902 B2 | 2/2010 | Graham | |
| 7,702,785 B2 | 4/2010 | Bruton, III | |
| 7,739,334 B1 | 6/2010 | Ng | |
| 7,788,382 B1 | 8/2010 | Jones | |
| 7,840,631 B2 | 11/2010 | Farcasiu | |
| 7,912,896 B2 | 3/2011 | Wolovitz | |
| 7,917,641 B2 | 3/2011 | Crampton | |
| 8,041,776 B2 | 10/2011 | Friedman | |
| 8,117,344 B2 | 2/2012 | Mendez | |
| 8,166,106 B2 | 4/2012 | Biggs | |
| 8,572,676 B2* | 10/2013 | Sapp | H04L 41/0806 726/1 |
| 9,185,099 B2* | 11/2015 | Brannon | H04L 63/08 |
| 9,202,045 B2 | 12/2015 | Fontjin | |
| 9,436,820 B1* | 9/2016 | Gleichauf | G06F 21/50 |
| 9,769,141 B2* | 9/2017 | Brannon | H04L 63/08 |
| 10,257,180 B2* | 4/2019 | Brannon | H04L 63/08 |
| 2002/0055967 A1 | 5/2002 | Coussement | |
| 2003/0172166 A1 | 9/2003 | Judge | |
| 2003/0225765 A1 | 12/2003 | Frieden | |
| 2003/0233439 A1 | 12/2003 | Stone | |
| 2004/0078568 A1 | 4/2004 | Pham | |
| 2005/0198332 A1 | 9/2005 | Laertz | |
| 2006/0156416 A1 | 7/2006 | Huotari | |
| 2007/0136492 A1 | 6/2007 | Blum | |
| 2007/0156897 A1 | 7/2007 | Lim | |
| 2007/0174433 A1 | 7/2007 | Mendez | |
| 2007/0220009 A1 | 9/2007 | Morris | |
| 2007/0266422 A1 | 11/2007 | Germano | |
| 2007/0288637 A1 | 12/2007 | Layton | |
| 2008/0133712 A1 | 6/2008 | Friedman | |
| 2008/0201453 A1 | 8/2008 | Assenmacher | |
| 2009/0217354 A1 | 8/2009 | Blum | |
| 2009/0307362 A1 | 12/2009 | Mendez | |
| 2010/0005125 A1 | 1/2010 | Mendez | |
| 2010/0005195 A1 | 1/2010 | Mendez | |
| 2010/0023630 A1 | 1/2010 | Mendez | |
| 2010/0100641 A1 | 4/2010 | Quinlan | |
| 2010/0115582 A1 | 5/2010 | Sapp | |
| 2010/0242097 A1 | 9/2010 | Hotes | |
| 2010/0005157 A1 | 10/2010 | Mendez | |
| 2010/0268844 A1 | 10/2010 | Quinlan | |
| 2011/0082900 A1 | 4/2011 | Nagpal | |
| 2011/0153779 A1 | 6/2011 | Mendez | |
| 2011/0167470 A1 | 7/2011 | Walker | |
| 2011/0167479 A1 | 7/2011 | Maes | |
| 2011/0185403 A1 | 7/2011 | Dolan | |
| 2011/0202589 A1 | 8/2011 | Piemot | |
| 2011/0225252 A1 | 9/2011 | Bhat | |
| 2011/0320552 A1 | 12/2011 | Friedman | |
| 2012/0159572 A1* | 6/2012 | Patel | H04L 63/102 726/3 |
| 2013/0086645 A1 | 4/2013 | Srinvasan | |
| 2013/0097665 A1* | 4/2013 | Ikeda | G06F 21/62 726/1 |
| 2013/0111541 A1 | 5/2013 | Yin | |
| 2013/0219176 A1 | 8/2013 | Akella | |
| 2013/0219470 A1* | 8/2013 | Chintala | G06F 16/27 726/4 |
| 2013/0247144 A1 | 9/2013 | Marshall | |
| 2013/0254401 A1* | 9/2013 | Marshall | G06F 21/6218 709/226 |
| 2013/0268357 A1 | 10/2013 | Heath | |
| 2013/0347094 A1 | 12/2013 | Bettini | |
| 2014/0007222 A1 | 1/2014 | Qureshi | |
| 2014/0115668 A1 | 4/2014 | Stuntebeck | |
| 2014/0181003 A1 | 6/2014 | Kling | |
| 2014/0196159 A1* | 7/2014 | Mangalam-Palli | G06F 21/10 726/30 |
| 2014/0201816 A1 | 7/2014 | Brannon | |
| 2014/0269614 A1* | 9/2014 | Maguire | H04L 51/32 370/331 |
| 2014/0280955 A1* | 9/2014 | Stuntebeck | H04L 63/0435 709/226 |
| 2014/0282869 A1* | 9/2014 | Dabbiere | H04L 63/10 726/3 |
| 2014/0282897 A1 | 9/2014 | Stuntebeck | |
| 2016/0044035 A1 | 2/2016 | Huang | |
| 2016/0099972 A1 | 4/2016 | Qureshi | |

FOREIGN PATENT DOCUMENTS

| | | |
|---|---|---|
| JP | 2007048241 | 2/2007 |
| JP | 2016540321 | 12/2016 |
| WO | 2011088900 | 7/2011 |

OTHER PUBLICATIONS

Office Action dated Jun. 6, 2017 for Japanese Application No. 2016-543940.

Patent Examination Report dated Nov. 14, 2016 for Application No. 2014321579.

Quah et al., "User Awareness and Policy Compliance of Data Privacy in Cloud Computing", Jan.-Feb. 2013, Conferences in Research and Practice in Information Technology (CRPIT), vol. 144, pp. 3-12. (Year: 2013).

* cited by examiner

SECURELY AUTHORIZING ACCESS TO REMOTE RESOURCES

CROSS-REFERENCE TO RELATED APPLICATIONS

This application is a continuation of U.S. patent application Ser. No. 15/708,136, filed Sep. 19, 2017, which is a continuation of U.S. patent application Ser. No. 14/927,504, filed Oct. 30, 2015, which is a continuation of U.S. patent application Ser. No. 14/033,682, filed on Sep. 23, 2013, all of which are expressly incorporated herein by reference in their entireties.

FIELD OF APPLICATION

Embodiments of the present disclosure relate generally to application management and, more particularly, to methods and apparatuses for providing securely authorized access to remote resources.

BACKGROUND

Managing authorization for software application ("application") usage is critical to ensuring that sensitive resources are protected from unauthorized access. Depending on the sensitivity of any given application, an array of authorization rules may be necessary to ensure that the resources are adequately protected. Some applications may only require ensuring that an authorized user is requesting the resource. Other applications may require compliance with more stringent authorization rules, such as determining whether the user device executing the application is a secure user device. When dealing with applications that access medical records, financial records, or other resources that may pertain to an individual and contain confidential and/or personal information, even more advanced control over application usage may be desired. To date, application management solutions have not addressed the unique security concerns for authorizing application access to remote resources.

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

According to one example embodiment, a method is provided that includes receiving a request to determine whether a user device communicatively coupled to a resource server is authorized to access at least one resource hosted by the resource server and determining whether the user device communicatively coupled to the resource server is authorized to access the at least one resource hosted by the resource server based at least in part on whether the user device communicatively coupled to the resource server has been issued a management identifier. The method further includes providing a response indicating that the user device communicatively coupled to the resource server is authorized to access the at least one resource hosted by the resource server in response to a determination that the user device communicatively coupled to the resource server is authorized to access the at least one resource hosted by the resource server. The method yet further includes providing a response indicating that the user device communicatively coupled to the resource server is not authorized to access the at least one resource hosted by the resource server in response to a determination that the user device communicatively coupled to the resource server is not authorized to access the at least one resource hosted by the resource server.

According to another example embodiment, a system is provided that includes at least one processor and at least one memory storing program code instructions. The at least one memory and program code instructions of the example embodiment are configured to, with the at least one processor, direct the system to at least receive a request to perform a management operation from a service being executed by the at least one processor, receive a request to determine whether a user device communicatively coupled to a resource server is authorized to access at least one resource hosted by the resource server and determine whether the user device communicatively coupled to the resource server is authorized to access the at least one resource hosted by the resource server based at least in part on whether the user device communicatively coupled to the resource server has been issued a management identifier. The system may be further directed to at least provide a response indicating that the user device communicatively coupled to the resource server is authorized to access the at least one resource hosted by the resource server in response to a determination that the user device communicatively coupled to the resource server is authorized to access the at least one resource hosted by the resource server. The system may be yet further directed to provide a response indicating that the user device communicatively coupled to the resource server is not authorized to access the at least one resource hosted by the resource server in response to a determination that the user device communicatively coupled to the resource server is not authorized to access the at least one resource hosted by the resource server.

According to yet another example embodiment, a computer program product is provided that includes a non-transitory computer-readable storage medium having program code portions embodied therein. In particular, the program code portions may be configured to, upon execution, direct an apparatus to at least receive a request to perform a management operation from a service being executed by the apparatus, receive a request to determine whether a user device communicatively coupled to a resource server is authorized to access at least one resource hosted by the resource server and determine whether the user device communicatively coupled to the resource server is authorized to access the at least one resource hosted by the resource server based at least in part on whether the user device communicatively coupled to the resource server has been issued a management identifier. The apparatus may be further directed to at least provide a response indicating that the user device communicatively coupled to the resource server is authorized to access the at least one resource hosted by the resource server in response to a determination that the user device communicatively coupled to the resource server is authorized to access the at least one resource hosted by the resource server. The apparatus may be yet further directed to provide a response indicating that the user device communicatively coupled to the resource server is not authorized to access the at least one resource hosted by the resource server in response to a determination that the user device communicatively coupled to the resource server is not authorized to access the at least one resource hosted by the resource server.

According to another example embodiment, an apparatus is provided that includes means for receiving a request to perform a management operation from a service being executed by the apparatus, means for receiving a request to determine whether a user device communicatively coupled to a resource server is authorized to access at least one resource hosted by the resource server and means for determining whether the user device communicatively coupled to the resource server is authorized to access the at least one resource hosted by the resource server based at least in part on whether the user device communicatively coupled to the resource server has been issued a management identifier. The apparatus further includes means for providing a response indicating that the user device communicatively coupled to the resource server is authorized to access the at least one resource hosted by the resource server in response to a determination that the user device communicatively coupled to the resource server is authorized to access the at least one resource hosted by the resource server. The apparatus yet further includes means for providing a response indicating that the user device communicatively coupled to the resource server is not authorized to access the at least one resource hosted by the resource server in response to a determination that the user device communicatively coupled to the resource server is not authorized to access the at least one resource hosted by the resource server.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
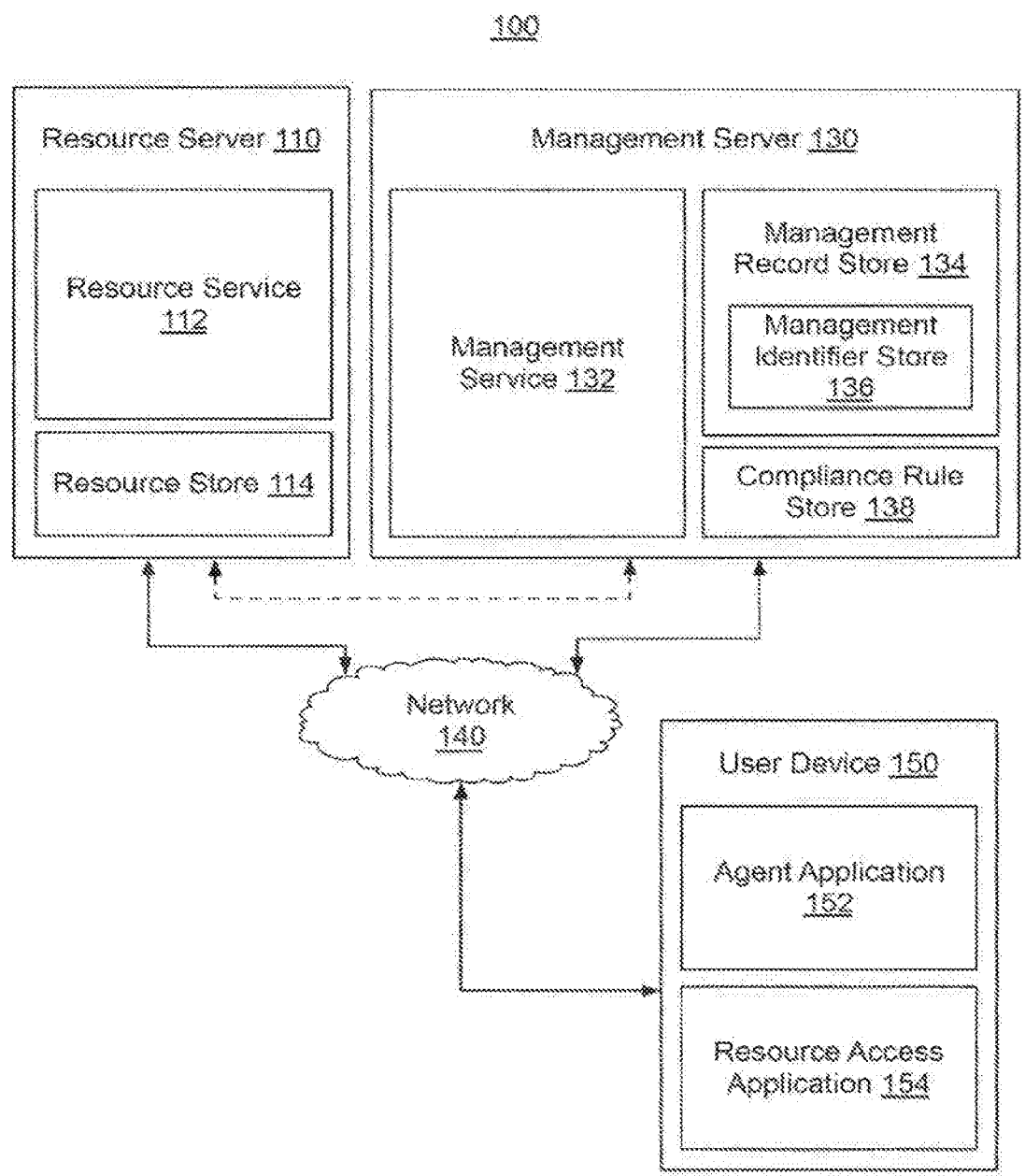
FIG. 1 is a schematic representation of an example system which may be configured according to example embodiments of the present disclosure.

The present disclosure now will be described more fully hereinafter with reference to the accompanying drawings, in which some, but not all embodiments of the disclosure are shown. Wherever possible, the same reference numbers are used in the drawings and the following description to refer to the same or similar elements. While embodiments of the disclosure may be described, modifications, adaptations, and other implementations are possible. For example, substitutions, additions, subtractions and/or modifications may be made to the elements illustrated in the drawings, as indicated in some cases via dashed lines, and the methods described herein may be modified by substituting, reordering, or adding stages to the disclosed methods. Indeed, the present disclosure may be embodied in many different forms and should not be construed as limited to the embodiments set forth herein; rather, these embodiments are provided so that the present disclosure will satisfy applicable legal requirements. Accordingly, the following detailed description does not limit the present disclosure. Instead, the proper scope of the present disclosure is defined by the appended claims.

As used herein, the terms "resources," "content," "data," and similar terms may be used interchangeably to refer to data capable of being transmitted, received, processed and/or stored in accordance with embodiments of the present invention. Thus, use of any such terms should not be taken to limit the spirit and scope of embodiments of the present disclosure.

Additionally, as the term will be used herein, "circuitry" may refer to hardware-only circuit implementations (e.g., implementations in analog circuitry and/or digital circuitry); combinations of circuits and computer program product(s) including software and/or firmware instructions stored on one or more, i.e., at least one, computer readable memories that work together to cause a system and/or an apparatus to perform one or more functions described herein; and circuits, such as, for example, one or more microprocessors or portions of one or more microprocessors, that require software or firmware for operation even if the software or firmware is not physically present. This definition of "circuitry" is applicable to all uses of this term, including in any claims. As another example, the term "circuitry" also includes implementations comprising one or more processors and/or portion(s) thereof and accompanying software and/or firmware. As another example, the term "circuitry" also includes, for example, an integrated circuit or applications processor integrated circuit for a portable communication device or a similar integrated circuit in a server, a network device, and/or other computing device.

As defined herein, a "computer-readable storage medium" refers to a non-transitory physical storage medium (e.g., volatile or non-volatile memory device), and can be differentiated from a "computer-readable transmission medium," which refers to an electromagnetic signal. Furthermore, "at least one" and "one or more" both, as used herein, refer to any non-zero quantity and will be used interchangeably herein.

The present disclosure is generally directed to application management and, more particularly, to systems, methods, apparatuses, and computer program products for securely authorizing access to remote resources. As used herein, applications refer to packages of programming code, or software programs, that may be interpreted and executed by operating systems of user devices. Applications are designed to perform specific tasks for users of user devices, such as accessing resources stored on resource servers that are communicatively coupled to such user devices. Common examples of applications that seek access to remote resources include applications used as productivity/business tools, applications that assist with graphics and multimedia projects, applications that support home, personal, and educational activities, and applications that facilitate communications with other user devices.

Example embodiments of such user device management systems, methods, apparatuses, and computer program products may be configured to securely authorize access to remote resources, such as electronic records or other types of content pertaining to at least one individual and/or at least one enterprise. For example, embodiments may be configured to control access to remote resources by limiting access to user devices that have been issued management identifiers. Additionally, embodiments may be configured to control access to remote resources by further limiting access to user devices that satisfy at least one compliance rule. Numerous other such examples are also possible according to example embodiments, some of which will be described below.

Having thus provided an overview of features and/or functionality that may be provided according to some example embodiments, attention will now be turned to the Figures so that certain example embodiments may be described in more detail.

FIG. 1 illustrates a block diagram of an example system for authorizing application usage and access to remote resources. While FIG. 1 illustrates one example configuration of such a system, numerous other configurations may be used according to example embodiments of the present invention. With reference to FIG. 1, however, the system for authorizing application usage and access to remote resources may include at least one resource server 110, at least one enterprise mobility management server 130, and at least one user device 150.

The user device 150 may comprise any electronic device configured to communicate over one or more networks, such as the network 140 depicted in FIG. 1. For example, the user device 150 may comprise one or more electronic devices such as a mobile telephone, smartphone, tablet computer, PDA, pager, desktop or laptop computer, a set-top box, a music player, a game console, or any of numerous other fixed or portable communication devices, computation devices, content generation devices, content consumption devices, or combinations thereof. The user device 150 may comprise at least one executable application, i.e. software program, such as the agent application 152 and resource access application 154. The agent application 152 and/or resource access application 154 may be stored in the memory 210 (Depicted in FIG. 2) of the user device 150, which may be executed by the operating system 215 (Depicted in FIG. 2) of the user device 150 to perform certain functionality associated with each respective application.

In particular, the agent application 152 may be communicatively coupled to a management service 132 executed by a management server 130, as described herein, to locally enforce instructions transmitted to the agent application 152 by the management service 132, such as user device 150 management commands configured and/or input by an administrator. Similarly, the agent application 152 may be communicatively coupled to a resource service 112 executed by a resource server 110, as described herein, to locally enforce instructions transmitted to the agent application 152 by the resource service 112, such as instructions to download certain resources 258 hosted by the resource server 110 via the resource store 114. The resource access application 154 may, for instance, access resources 258 hosted by the resource server 110 (e.g. resources 258 stored within the resource store 114 that are served up for user device 150 via the network 140). In particular, the resource access application 154 may download, receive, upload, transmit, view, execute, modify, or otherwise manipulate resources 258, such as those hosted by the resource server 110.

The resource server 110 may, for example, comprise any type of network-accessible electronic device or system that includes a service, such as the depicted resource service 112, that facilitates access to the contents of a storage, such as the depicted resource store 114. The resource server 110 may, according to one example embodiment, comprise a public server that may be accessible to anyone who connects to it over a network, such as the network 140. According to another example embodiment, the resource server 110 may be a private server accessible only over a private network, such as the network 140, and/or may be located behind a firewall. Common examples of the resource server 110 may include cloud-based Salesforce.com, Dropbox, Box, Egnyte, NetSuite, Citrix ShareFile, Rackspace, Amazon Web Services, Google Drive, BackupGenie, SugarSync, Mozy, Bitcasa Infinite Drive, MediaFire, Mega, Ubunto One, Huddle, Evernote, Microsoft SharePoint, Microsoft Office365, Microsoft SkyDrive, and Apple iCloud.

According to another example embodiment, the resource server 110 may require user registration and/or may require use of a managed user device 150 to access it. More particularly, a managed user device 150 may include an authorized user device 150, such as a user device 150 communicatively coupled to a management server 130, a user device 150 enrolled into and/or registered with a management service 132, a user device 150 associated with a service contract for a management service 132, and/or a user device 100 that satisfies at least one compliance rule 260 (depicted in FIG. 2) associated with a management service 132.

In any case, the resource service 112 may determine if a user device 150 is authorized to communicate with the resource server 110 and/or access the contents of the resource store 114. If the resource service 112 determines that a user device 150 is authorized, the resource service 112 may permit the user device 150 to communicate with the resource server 110 and/or access the contents of the resource store 114. If the resource service 112 determines that a user device 150 is not authorized, the resource service 112 may prohibit the user device 150 from communicating with the resource server 110 and/or accessing the contents of the resource store 114. The resource server 110 may store any type of data, such as various types of general, individual-specific, or enterprise-specific content, applications, records, and/or any other data in the resource store 114. Common examples of resources 258 (depicted in FIG. 2) that may be stored by the resource server 110 in the resource store 114 include documents and/or word processor files, photos and/or graphic files, presentations and/or slide show files, spreadsheets and/or other computational files, and other electronic files commonly used for business.

For purposes of convenience, the resource server 110 is referred to herein in the singular, although it will be understood that a plurality of servers may be employed in the arrangements as descried herein. Furthermore, in some embodiments, multiple resource servers 110 may operate on the same server computer. The components executed on the resource server 110, for example, may comprise various applications, services, processes, systems, engines, or functionality not disclosed in detail herein.

The management server 130 may be any type of network-accessible electronic device or system that includes a service, such as the depicted management service 132, and a storage, such as the depicted management record store 134, management identifier store 136, and compliance rule store 138. For purposes of convenience, the management identifier store 136 is depicted within the management record store 134, as in certain embodiments a management identifier 256 (depicted in FIG. 2) stored within the management identifier store 136 may be related to and/or associated with a management record stored within the management record store 136. The management server 130 may be configured to communicate with the user device 150 and/or the resource server 110 over one or more networks, such as the depicted network 140, to provide user device 150 management capabilities. For example, the management server 130 may comprise cloud-based solutions, server computers and/or any other system providing user device 150 management capabilities.

In any case, the management service 132 may determine whether a user device 150 is authorized to perform certain functionality, such as accessing resources 258 stored within a resource store 114 of a resource server 110, based at least in part on at least one management record stored within the management record store 134, at least one management identifier 256 stored within the management identifier store 136, and/or at least one compliance rule 260 stored within the compliance rule store 138. For instance, the management service 132 may query the management record store 134 to determine whether a management record is associated with a user device 150 seeking to perform certain functionality, which may be required for the user device 150 to be authorized to perform the functionality. The management service 132 may also query the management identifier store 136 to determine whether a management identifier has been issued to the user device 100, which may be alternatively or additionally required for the user device 150 to be authorized to perform the functionality. The management service 132 may also query the compliance rule store 138 to identify at least one compliance rule 260 that must be satisfied by the user device 150, which may be alternatively or additionally required for the user device 150 to be authorized to perform the functionality.

For purposes of convenience, the management server 130 is referred to herein in the singular, although it will be understood that a plurality of servers may be employed in the arrangements as descried herein. Furthermore, in some embodiments, multiple management servers 130 may operate on the same server computer. The components executed on the management server 130, for example, may comprise various applications, services, processes, systems, engines, or functionality not disclosed in detail herein. The management service 132 executed by the management server 120 may, according to some example embodiments, be configured to notify the resource service 112 executed by the resource server 110 that at least one user device 150 is authorized to access resources 258 stored by the resource server 110 within the resource store 114.

As described herein, the management server 130 may comprise a management service 132 and a compliance rule store 138 storing one or more compliance rules, e.g., compliance policies, that may be applicable to a user device 150. While the management service 132 is shown as within the management server 130, the management application 132 may additionally or alternately be within the user device(s) 150, and/or remotely located on the resource server 110 and may be remotely updated, such as periodically, via management server 130 according to any number of suitable over-the-air (OTA) updating methods. In some embodiments, for instance, an agent application 152 executed by the user device 150 may provide functionality equivalent to and/or on behalf of the management service 132.

Attempts by the user device 150 to perform certain functionality, such as accessing, downloading, uploading, viewing, and/or modifying resources 258 may require the user device 150 to be in compliance with one or more of the compliance rules 260. Depending on the sensitivity and/or nature of a given resource 258, different compliance rules 260 may be necessary to ensure that the resource 258 is adequately restricted. Some resources 258 may only require ensuring that the proper user is requesting the functionality, such as a user that has been issued a management identifier 256 by the management service 132. Other resources 258 may require compliance with more stringent authorization rules, such as determining whether the resources 258 are restricted during certain time windows or geographic areas. Accordingly, the user device 150 and/or the management server 130 may be operative to determine whether the user of the user device 150 is authorized to access the resources 258 at the time a user of the user device 150 requests to access such resources 258.

The management server 130 may, for example, use the compliance rules 260 to impose hardware restrictions regarding the use of specific user devices 150 and/or specific user device 150 features, such as, for instance, cameras, Bluetooth, IRDA, tethering, external storage, a mobile access point, and/or other hardware restrictions. The compliance rules 260 may additionally or alternatively impose software restrictions such as the use of specific user device 150 operating systems or applications, internet browser restrictions, screen capture functionality, and/or other software restrictions. Mobile device management restrictions may additionally or alternatively be included in the compliance rules 260 and may comprise encryption requirements, firmware versions, remote lock and wipe functionalities, logging and reporting features, GPS tracking, and/or other user device 150 management features.

The management server 130 may determine whether one or more characteristics of a requesting user device 150 satisfy one or more of the restrictions enumerated in the compliance rules 260. For example, the management server 130 may determine that a requesting user device 150 that has a camera, Bluetooth capability, and is executing a specified version of an operating system satisfies the compliance rules 260. As another example, the management server 130 may determine that a requesting user device 150 that is associated with an external storage unit and screen capture functionality enabled does not satisfy the compliance rules 260.

In some embodiments, an agent application 152 executed by the user device 150 may make the compliance determination based on a device profile 252 (Depicted in FIG. 2) describing the user device 150 and/or user data 254 (Depicted in FIG. 2) describing a user of the user device 150, which may include user credentials and/or user preferences. For instance, the agent application 152 may monitor calls by applications on the user device 150, such as the resource access application 152, a productivity application, a web browser, an email client and/or any other application, to an operating system 215 of the user device 150 to determine whether the user device 150 seeks to perform functionality associated with one and/or more of the compliance rules 260 described above, such as viewing, modifying, transmitting, and/or receiving resources 258. Additionally, the agent application 152 executed on the user device(s) 150 may approve and/or deny the associated functionality requests. For instance, the agent application 152 may instruct the operating system 215 of the user device 150 to prevent the user device 150 from viewing, modifying, transmitting, and/or receiving resources 258 in response to a determination that a compliance rule 260 is not satisfied, which may be effectuated by notifying the resource service 112 and/or management service 132 that the user device 150 is not authorized to access the resources 258.

In some embodiments, the agent application 152 executed on the user device 150 may rely on the management server 130 to determine whether a given functionality of the device, such as viewing, modifying, transmitting, and/or receiving resources 258, is authorized according to the compliance rules 260. For instance, the agent application 152 may transmit information, such as the device profile 252 and/or user data 254, to the management server 130 so that the management server 130 may determine whether the user device 150 is authorized to perform the functionality. Additionally, the management server 130 may approve and/or deny the associated functionality requests. For instance, the management server 130 may notify the resource service 112 of whether the user device 150 is authorized to access resources 258 stored within the resource store 114. In other cases, the management server 130 might instruct the agent application 152 on the user device 150 to not allow resources 258 to be accessed, such as preventing the downloading, viewing, modification and/or transmission of the resources 258.

In some embodiments, the compliance rules 258 may comprise user device 150 settings and/or executable instructions that define which functionality the operating system 215 of the user device 150 is authorized to perform. Furthermore, the compliance rules 258 may comprise a list of user device 150 functions, such as those provided by Application Programming Interface's (API's) associated with the operating system 215 and/or a platform library 240 (Depicted in FIG. 2) that may be treated as protected user device 150 functions. Accessing resources 258 hosted by the resource server (e.g. resources 258 stored by the resource server 110 in the resource store 114) may comprise or otherwise be associated with one or more of these functions protected user device 150 functions. Calls to these functions, such as attempts to access the resources 258 (e.g. download, receive, transmit, upload or modify the resources 258) may result in checks by the user device 150 (e.g. via the agent application 152) and/or the management server 130 (e.g. via the management service 112) to determine whether the user device 150 satisfied the applicable compliance rules 260.

In some embodiments, the agent application 152 may perform a set of ordered operations to accomplish a requested user device 150 function. These operation sets may be defined on, e.g., stored in a memory of, the user device(s) 150 and/or the management server 130 and may comprise one or more operations to determine whether the user device is in compliance with compliance rules 258 (e.g. those stored within the compliance rule store 139 of the management server 130). The agent application 152 may control at least one respective computing resource of the user device 150. The operations may include configuring at least one respective computing resource 258 of the user device, such as restricting access to at least one resource 258 hosted by the resource server 110 that is managed by the agent application 152 and/or management service 132.

As shown in FIG. 1, the user device 150, management server 130, and/or resource server 110 may communicate with one another directly and/or via the network 140. The user device 150, management server 130, and/or resource server 110 may connect to the network 140 via wired or wireless means, such as via one or more intermediate networks. For example, the user device(s), management server 130, and/or resource server 110 may connect with the network 140 via wired means such as Ethernet, USB (Universal Serial Bus), or the like, or via wireless means such as, for example, WI-FI, Bluetooth, or the like, or by connecting with a wireless cellular network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network 140.

Accordingly, the network 140 may comprise, for example, one or more wired and/or wireless networks 140 such as one or more wireless local area networks (WLAN), wireless wide area networks (WWAN), Ethernet networks, fiber-optic networks, and/or any other type of wired and/or wireless network 140 now known or later developed. Additionally, the network 140 may comprise the Internet and/or one or more intranets, extranets, microwave networks, satellite communications networks, cellular networks, infrared communication networks, global area networks, or other suitable networks, etc., or any combination of such networks 140.

Figure 2:
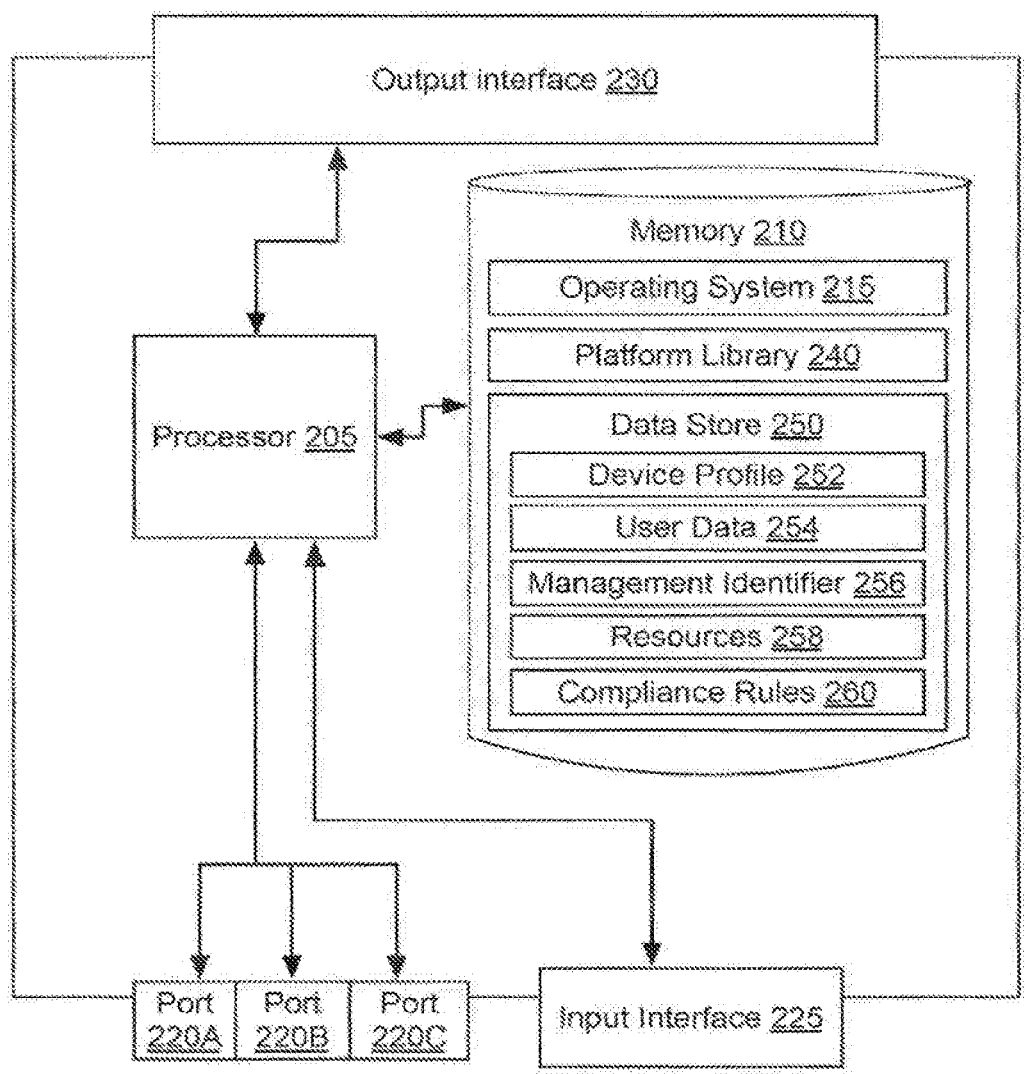
FIG. 2 is a schematic representation of an example user device which may be configured according to example embodiments of the present disclosure.

Turning now to FIG. 2, a diagram of an example user device 150 is depicted. While FIG. 2 illustrates one example configuration of such a user device 150, numerous other configurations may be used according to some example embodiments. With reference to FIG. 2, however, the user device 150 may comprise a processor 205 (e.g. at least one processor, co-processor, and/or processing circuitry) and at least one memory 210. Depending on the configuration and type of device, the memory 210 may comprise, but is not limited to, volatile (e.g. random access memory (RAM)), non-volatile (e.g. read-only memory (ROM)), flash memory, or any combination thereof. The memory 210 may store executable programs, (e.g. program code instructions, and related data components of various applications and modules for execution by the processor 205), such as an agent application 152 and/or a resource access application 154. The at least one memory 210 may be communicatively coupled to the at least one processor 205, such as via one or more system busses for transferring data there between.

Basic functionality of the user device 150 may be provided by an operating system 215 contained in the at least one memory 210 and executed via the at least one processor 205. One or more programmed software applications may be executed by utilizing the computing resources 258 in user device 150. For example, applications stored in the memory 210 may be executed by the processor 205 under the auspices of operating system 215, such as web browsing applications, email applications, instant messaging applications, applications configured to view and/or manipulate resources 258, and/or other applications capable of receiving and/or providing resources 258.

Data provided as input to and/or generated as output from the application(s) may be stored in the memory 210 and read by the processor 205 from the memory 210 as needed during the course of application program execution. Input data may be data stored in the memory 210 by a secondary application or other source, either internal or external to user device 150, or provided during installation of the application.

The user device 150 may include one or more communication ports, such as the communication ports 220(A)-(C) depicted in FIG. 2. It will be understood that although three communication ports are depicted in the example user device 150 depicted in FIG. 2, any number of such ports may be present according to other example configurations of a user device 150. Such communication ports 120(A)-(C) may allow the user device 150 to communicate with other devices, such as other user devices 150, the management server 130, and/or the resource server 110, and may comprise components such as a wireless network connectivity interface, an Ethernet network adapter, and/or a modem. For example, the wireless network connectivity interface may comprise one and/or more of a wireless radio transceiver, PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, and/or the like. According to some embodiments, the communication ports 120(A)-(C) may additionally or alternatively include one or more antennas, supporting hardware and/or software, and/or supporting circuitry configured to receive and/or transmit signals according to any short-range communication protocols and/or standards, such as, for example, near field communication (NFC), Bluetooth, and/or Bluetooth Low Energy (BLE). According to some embodiments, the communication ports 120(A)-(C) may additionally or alternatively include one or more interfaces configured to provide location services, such as one or more antennas, supporting hardware and/or software, and/or supporting circuitry configured to receive signals transmitted from GPS satellites.

The user device 150 may also receive data as user input via an input interface 225, such as one or more of a keyboard, a mouse, a pen, a stylus, a sound input device, a touch input device, a biometric device, a capture device, a brain-computer interface (BCI), etc. The input interface 225 may additionally or alternatively comprise one or more sensing devices, such as one or more cameras, microphones, motion detectors, proximity sensors, and/or the like, which may be configured to capture visual, aural, physical, and/or other types of stimuli, such as spoken words, motions, gestures, and/or the like.

Data generated by applications may be caused to be stored in the memory 210 by the processor 205 during the course of application program execution. Data may be provided to the user of the user device 150 during application program execution by means of an output interface 230. The output interface 230 may comprise one or more devices configured to provide information and/or stimuli to a user, such as one or more display devices; speakers; force, vibration, and/or haptic feedback generating devices; implanted and/or physiologically-integrated output devices; and/or the like. It will be understood that although the input and output interfaces 225, 230 are depicted as distinct components in FIG. 2, they may, according to example embodiments, be embodied by one or more components comprising both input and output functionality. For example, the input and output interface 225, 230 may comprise a touchscreen device, e.g., a display device configured to both display information and receive user input, such as via a touch detection interface.

The at least one memory 210 may also comprise a platform library 240. The platform library 240 may comprise one or more collections of functionality, e.g., utilities, useful to multiple applications, such as may be provided by an application programming interface (API) to a software development kit (SDK). These utilities may be accessed by applications as necessary so that each application does not have to contain these utilities, thus allowing for memory consumption savings and a consistent user experience.

Furthermore, embodiments of this disclosure may be practiced in conjunction with a graphics library, other operating systems, or any other application program and is not limited to any particular application or system. The devices described with respect to the Figures may have additional features or functionality. For example, user device 150 may also include additional data storage devices (removable and/or non-removable) such as, for example, magnetic disks, optical disks, or tape (not shown).

The user device 150 may store in the memory 210. e.g., in a data store 250, a device profile 252 and user data 254.

The device profile 252 may, for example, comprise information such as an indication of a current position of user device 150 and/or indications of various hardware, software, and/or security attributes pertaining to the user device 150. For instance, the device profile 252 may represent hardware specifications of the user device 150, version and/or configuration information of various software program and/or hardware components installed on user device 150, data transmission protocols enabled on user device 150, version and usage information of the various resources 258 stored on user device 150, and/or any other attributes associated with the state of user device 150. The device profile 252 may additionally or alternatively comprise operational status information, such as information regarding any errors or faults detected in the user device 150; information regarding device temperature; information regarding resource levels such as battery levels, free storage space, and/or signal strengths; and/or the like. The device profile 252 may additionally or alternatively comprise data indicating a date of last virus scan of the user device 150, a date of last access of the user device 150 by an IT representative, a date of last service of the user device 150 by an IT representative, and/or any other data indicating maintenance and/or usage of the user device 150. The device profile 252 may additionally or alternatively comprise indications of past behavior of associated users, such as resources 258 accessed, charges for resource 258 accesses, and/or inventory accessed from such resources 258.

The user data 254 may comprise information regarding one or more users of the user device 150. For instance, the user data 254 may comprise one or more user credentials, such as a username and password required to gain authorization to access resources 258 hosted by the resource service 112 of the resource server 110. Moreover, the user data 254 may comprise one or more user preferences (e.g. one or more parameters that may affect the experience of the user). Additionally or alternatively, the user data 254 may include indications of a user device 150 user's age, gender, bodily traits, preferred resource 258 types and/or any other type of information relating to a user or combinations of such information. Additionally or alternatively, the user data 254 may include indications of one or more access levels, roles, policy groups, or the like of a user device 150 user that may be required to gain authorization to access resources 258 hosted by the resource service 112 of the resource server 110.

The user device 150 may also store at least one management identifier 256 in the data store 250. In certain embodiments, the management identifier 256 may include a number, string, word, certificate, token, profile, combinations thereof, and/or other electronic data uniquely describing the user device 150 that indicates that the user device 150 is authorized to access resources 258 hosted by the resource server 110. For instance, the management identifier 256 may provide an indication that the user device 150 is managed by the management service 132 executed by the management server 130, which may provide authorization to access the resources 258 hosted by the resource server 110. In some embodiments, the management identifier 256 may include a server address and/or server credentials that provide a means for establishing a communicative connection to a server capable of determining that the management identifier 256 is valid and/or that the user device 150 is authorized to access resources 258 hosted by the resource server 110. For example, the management identifier 256 may include the server address for the management server 130 and/or server credentials for the management server 130, which may enable establishing a communicative connection to the management service 132 executed by the management server 130 for purposes of validating the management identifier 256 and/or the authorization of the user device 150 to access resources 256 hosted by the resource server 110.

In certain embodiments, the management identifier 256 may be issued to and/or for the user device 150 by the management service 132 of the management server 130. The management identifier 256 may be received from, downloaded from and/or otherwise provided by the management service 132 via the network 140, such as when the user device 150 is enrolled into the management service 132 and/or satisfies one or more compliance rules 260. The management identifier 256 may be transmitted to, uploaded to and/or otherwise provided to the resource service 112, such as when the user device 150 seeks to access resources 258 hosted by the resource server 110, which may be used as a basis for determining whether the user device 150 is authorized to access the resources 258 hosted by the resource server 110. In other words, the management identifier 256 may provide a basis for ensuring that the user device 150 is a trusted user device 150.

In certain embodiments, the management identifier 256 may be distinct from the user device 150 to ensure that the user device 150 cannot replicate the management identifier 256 without the assistance of the issuer of the management identifier 256. More specifically, the management identifier 256 may be wholly or partially generated based on an element distinct from the user device 150. For instance, the management identifier 256 may include one or more of a random number, random character, and/or random symbol that only the issuer of the management identifier 256 knows, due to the issuer of the management identifier 256 having chosen the random number, random character, or random symbol for inclusion in the management identifier 256. Additionally, the management identifier 256 may exclude one or more elements known to the user device 150 to prevent the user device 150, or any applications executed by the user device 150, from replicating the management identifier 256. For example, the management identifier 256 may exclude, and/or not include, hardware and/or software identifiers known to the user device 150. Common examples of hardware and/or software identifiers that may be excluded from inclusion in the management identifier 256 include a serial number, a Wi-Fi address, a Bluetooth address, a IMEI number, a ICCID number, or a MEID number associated with the user device 150.

The user device 150 may further store at least one resource 258 in the data store 250. The resources 258 may, for example, include any data or content, such as databases, applications, audio/video content, electronic records, applications and/or application files, and/or the like. More specifically, resources 256 may include at least one of the following file types: data files, audio files, video files, three-dimensional image files, raster image files, vector image files, page layout files, text files, word processor files, spreadsheet files, presentation files, graphic files, audio files, photographic files, video files, database files, executable files, CAD files, web files, plug-in files, font files, system files, settings files, encoded files, compressed files, disk image files, developer files, backup files, and/or any other files. In certain embodiments, the resources 258 may be received from the resource server 110 via the resource service 112 and subsequently stored in the data store 250 of the user device 150 for use by the user device 150 in its execution of certain functionality and/or applications. In some embodiments, the resources 258 may be received from the resource server 110 in response to a request by the resource access application 154 for a transmission and/or download of the resources 258 from the resource server 110. Upon receiving the resources 258 from the resource server 110, the user device 150 may read from and/or write to the resources 258 during the execution of the resource access application 154.

Additionally, the user device 150 may store at least one compliance rule 260. As described herein, the compliance rules 260 may comprise requirements that must be satisfied by the user device 100 to perform certain functionality of the user device 150. For instance, the user device 150 may be required to satisfy one or more compliance rules 260 in order to be authorized to access resources 258 hosted by the resource server 258. Additionally, as described herein, the user device 150, such as via the agent application 152, may make a determination of whether the compliance rules 258 are satisfied, the resource service 112 make a determination of whether the compliance rules 258 are satisfied, and/or the management service 132 make a determination of whether the compliance rules 258 are satisfied. Thus, while depicted as being stored within the data store of 250, the compliance rules 258 may additionally or alternatively be stored within the resource server 110 and/or management server 130 for the resource service 112 and/or management service 132, respectively, to act upon.

Figure 3:
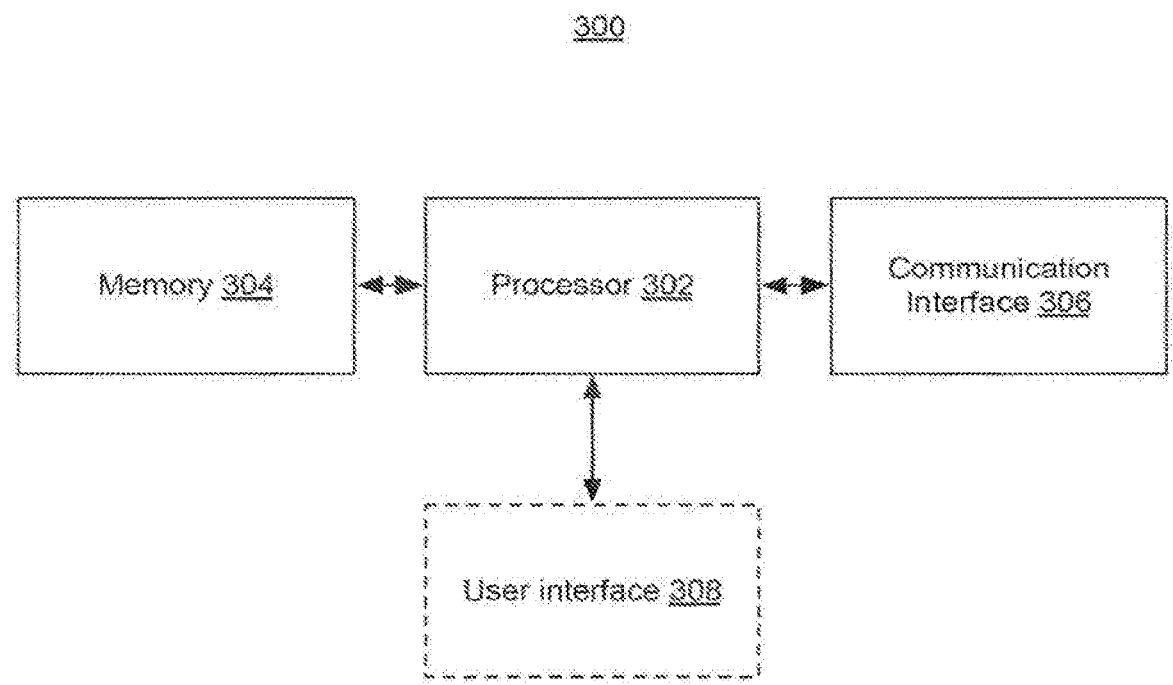
FIG. 3 is a schematic representation of an example apparatus that may be embodied by or otherwise associated with one or more electronic devices and which may be configured to implement example embodiments of the present disclosure; and, FIGS. 4, 5, 6, 7, 8 and 9 are flowcharts illustrating operations that may be performed in accordance with example embodiments of the present disclosure.

Example embodiments of the invention will now be described with reference to FIG. 3, in which certain elements of an apparatus 300 for implementing various functionality of the present invention are depicted. In order to implement such functionality, the apparatus 300 of FIG. 3 may be employed, for example, in conjunction with one or more of the user device 150, the management server 130, and/or the resource server 110 depicted in FIG. 1. However, it should be noted that the apparatus 300 of FIG. 3 may also be employed in connection with a variety of other devices, both mobile and fixed, in order to implement the various functionality of the present invention and therefore, embodiments of the present invention should not be limited to those depicted. It should also be noted that while FIG. 3 illustrates one example of a configuration of an apparatus 300 for implementing the functionality of the present invention, numerous other configurations may additionally or alternatively be used to implement embodiments of the present invention. Accordingly, it will be understood that various devices, components, and/or elements depicted and/or described as being in communication with each other may, for example, be embodied within a single device or distributed across multiple devices.

Referring now to FIG. 3, the apparatus 300 for providing individual-specific content management according to some example embodiments of the present invention may include or otherwise be in communication with a processor 302, a communication interface 308, and a memory device 304. As described below and as indicated by the dashed lines in FIG. 3, the apparatus 300 may also include a user interface 308, such as when the apparatus 300 is embodied by or otherwise associated with the user device 150. In some embodiments, the processor 302 (and/or co-processors or other processing circuitry assisting or otherwise associated with the processor 302) may be in communication with the memory device 304 via a bus configured to pass information among components of the apparatus 300. The memory device 304 may, for example, include one or more volatile and/or non-volatile memories. The memory device 304 may be configured to store information, data, content, applications, instructions, or the like, for enabling the apparatus 300 to carry out various functions in accordance with an example embodiment of the present invention. For example, the memory device 304 may be configured to store instructions, such as program code instructions, that, when executed by the processor 302, cause the apparatus 300 to carry out various operations.

The processor 302 may be embodied in a number of different ways. For example, the processor 302 may be embodied as one or more of a variety of hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 302 may include one or more processing cores configured to perform independently. A multi-core processor may enable multiprocessing within a single physical package. Additionally or alternatively, the processor 302 may include one or more processors configured in tandem via the bus to enable independent execution of instructions, pipelining and/or multithreading.

In an example embodiment, the processor 302 may be configured to execute instructions stored in the memory device 304 or otherwise accessible to the processor 302. Alternatively or additionally, the processor 302 may be configured to execute hard coded functionality. As such, whether configured by hardware or software methods, or by a combination thereof, the processor 302 may represent an entity (e.g., physically embodied in circuitry) capable of performing operations according to an embodiment of the present invention while configured accordingly. Thus, for example, when the processor 302 is embodied as an ASIC, FPGA or the like, the processor 302 may be specifically configured hardware for conducting the operations described herein. Alternatively, as another example, when the processor 302 is embodied as an executor of software instructions, the instructions may specifically configure the processor 302 to perform the algorithms and/or operations described herein when the instructions are executed. However, in some cases, the processor 302 may be a processor of a specific device (e.g. the user device 150, management server 130, and/or resource server 110) configured to employ an embodiment of the present invention by further configuration of the processor 302 by instructions for performing the algorithms and/or operations described herein. The processor 302 may include, among other things, a clock, an arithmetic logic unit (ALU) and logic gates configured to support operation of the processor 302.

The communication interface 306 may be any means such as a device or circuitry embodied in either hardware or a combination of hardware and software that is configured to receive and/or transmit data from/to a network, such as the network 140, and/or any other device or module in communication with the apparatus 300. In this regard, the communication interface 306 may include, for example, an antenna (or multiple antennas) and supporting hardware and/or software for enabling communications with a wireless communication network. Additionally or alternatively, the communication interface 306 may include the circuitry for interacting with the antenna(s) to cause transmission of signals via the antenna(s) or to handle receipt of signals received via the antenna(s). Additionally or alternatively, the communication interface 306 may include one or more antennas, supporting hardware and/or software, and/or supporting circuitry for receiving and/or transmitting signals according to any short-range communication protocols and/or standards, such as, for example, NFC, Bluetooth, and/or BLE. In some environments, the communication interface 308 may alternatively or also support wired communication. As such, for example, the communication interface 306 may include a communication modem and/or other hardware/software for supporting communication via cable, digital subscriber line (DSL), universal serial bus (USB) or other mechanisms.

In some embodiments, such as instances in which the apparatus 300 is embodied by or otherwise associated with the user device 150, the apparatus 300 may include a user interface 308 in communication with the processor 302 to receive indications of user input and/or to cause audible, visual, mechanical or other output to be provided to the user. As such, the user interface 308 may, for example, include a keyboard, a mouse, a joystick, a display, a touch screen, touch areas, soft keys, a microphone, a speaker, a BCI, or other input/output mechanisms and/or devices, such as any of those discussed above in the context of the input/output interfaces 225, 230 depicted in FIG. 2. The processor 302 may be configured to control one or more functions of one or more user interface elements through computer program instructions (e.g. software and/or firmware) stored on a memory accessible to the processor 302 (e.g. memory device 304). In other embodiments, however, such as in instances in which the apparatus 300 is embodied by the management server 130 and/or resource server 110, the apparatus 300 may not include a user interface 308.

It will be further understood that in embodiments in which the apparatus 300 is embodied by or otherwise associated with the user device 150, the memory device 304 may, for example, be embodied by the memory 210 depicted in FIG. 2; the processor 302 may, for example, be embodied by the processor 205 depicted in FIG. 2; the user interface 308 may, for example, be embodied by the input and/or output interfaces 225, 230 depicted in FIG. 2; and/or the communication interface 306 may, for example, be embodied by one or more of the communications ports 220A-C depicted in FIG. 2.

Referring now to FIGS. 4, 5, 6, 7, 8 and 9, various operations of an example embodiment of the present invention are depicted. As discussed below, the operations of FIGS. 4, 5, 6, 7, 8 and/or 9 may be performed by one or more apparatuses, such as the apparatus 300 depicted in FIG. 3, embodied by or otherwise associated with one or more of the user device 150, management server 130, and/or resource server 110 depicted in FIG. 1, so as to provide user device 150 management capabilities, such as securely authorizing access to remote resources 258.

Figure 4:
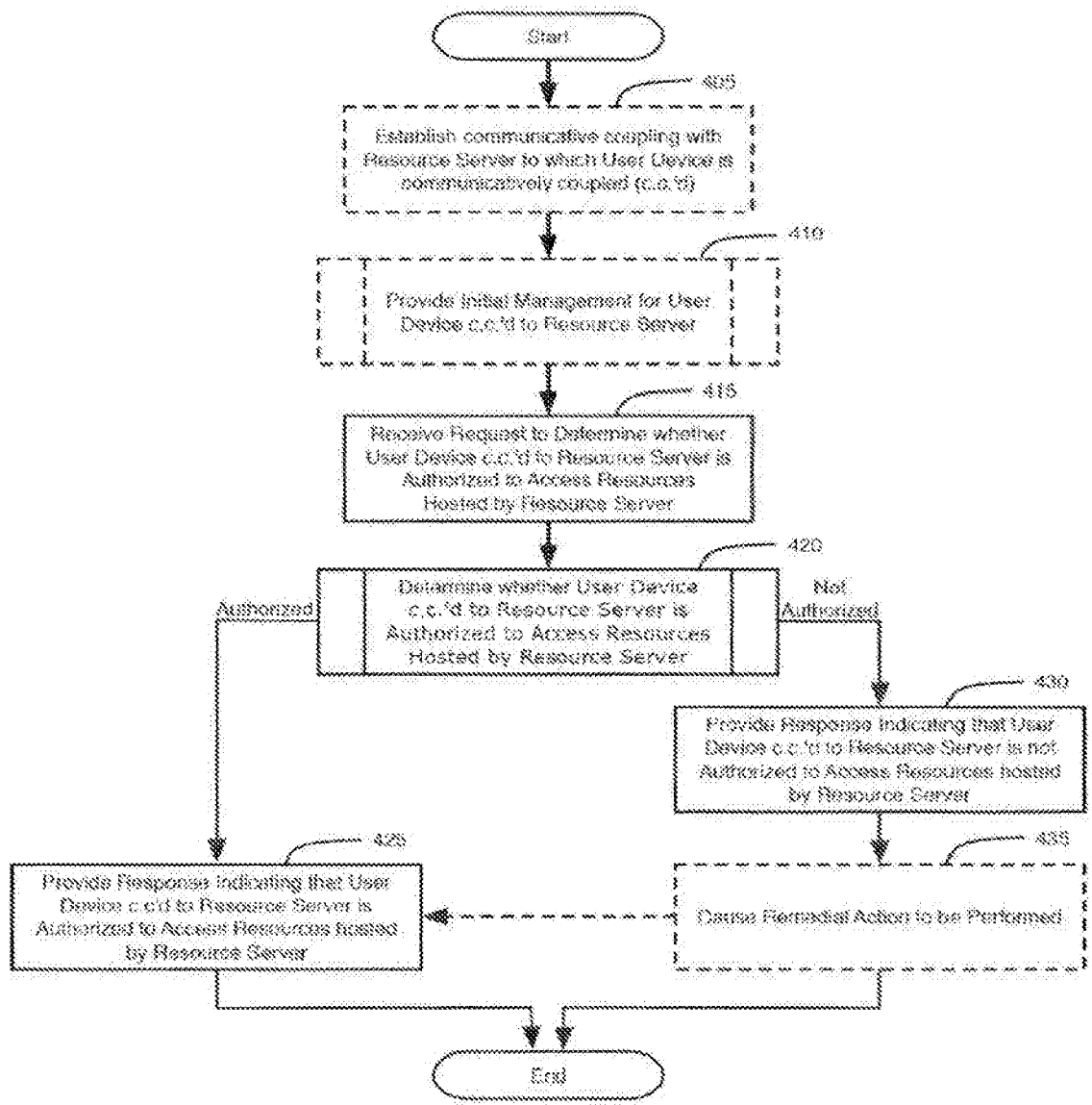

In this regard, and turning first to FIG. 4, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 4, namely stages 405, 410, 415, 420, 425, 430, and 435. In certain embodiments, at least one stage of FIG. 4 may be performed by the management server 130, such as via the management service 132 executed by the management server 130. Additionally or alternatively, at least one stage of FIG. 4 maybe performed by the user device 150, such as via the agent application 152 executed by the user device 150.

Optionally beginning with stage 405, a communicative coupling with a resource server 110 to which a user device 150 is communicatively coupled may be established. More specifically, prior to stage 405, a resource access application 154 executed by a user device 150 may have established a communicatively coupling to a resource service 112 executed by a resource server 110 in an attempt to access resources 258 hosted by the resource server 110, such as resources 258 stored within the resource store 114 of the resource server 110. Subsequently, here in stage 405, a communicative coupling may be established, for instance, between the resource server 110 and another element of the operating environment 100. In certain embodiments, the communicative coupling established in stage 405 may be established between a management service 132 executed by a management server 130 and the resource service 112 executed by the resource server 110. In some embodiments, the communicative coupling established in stage 405 may be established between an agent application 152 executed by the user device 150 and the resource service 112 executed by the resource server 110.

In any case, the communicative coupling may be established with the resource server 110 to which the user device 150 is communicatively coupled via a secure communication channel over the network 140, such as HTTPS and/or the like. The communicative coupling may be established via APIs specific to the resource service 112, such that the management service 132 and/or agent application 152 may communicate with and/or transmit instructions to the resource service 112. Additionally and/or alternatively, the communicative coupling may be established via APIs specific to the management service 132 and/or agent application 152, such that the resource service 112 may communicate with and/or transmit instructions to the management service 132 and/or agent application 152. Data transmitted via the communicative coupling may be encrypted, for instance using AES-256 encryption, to ensure that the data in transit over the communicative coupling cannot be intercepted and deciphered by a malicious application and/or device.

Optionally, then in stage 410, initial management of the user device 150 communicatively coupled to the resource server 110 may be provided. While stage 410 will be described in further detail with regard to FIGS. 5 and 6. Initial management of the user device 150 communicatively coupled to the resource server 110 generally relates to issuing a management identifier 256 to the user device 150. In certain embodiments, the issuance of the management identifier 256 to the user device 150 may be predicated based on whether the user device 150 is authorized to be issued a management identifier 256, which may be based on whether the user device 150 is managed, such as by the management service 132 executed by the management server 130, and/or whether the user device 150 satisfies certain compliance rules 260.

Then, in stage 415, a request to determine whether the user device 150 communicatively coupled to the resource server 110 is authorized to access at least one resource 258 hosted by the resource server 110 is received. Such a request to determine whether the user device 150 is authorized to access resources 258 hosted by the resource server 110 may be received, for instance, as a result of the resource server 110 not knowing the identity and/or characteristics of the user device 150, which may factor into the determination of whether the user device 150 is authorized. Additionally or alternatively, such a request to determine whether the user device 150 is authorized to access resources 258 hosted by the resource server 110 may be received, for example, as a result of the resource server 110 knowing that another party, and/or element of the operating environment 100, may have further information on the identity and/or characteristics of the user device 150.

In certain embodiments, the request to determine whether the user device 150 communicatively coupled to the resource server 110 is authorized to access resources 258 hosted by the resource server 110 may be received from the resource service 112 executed by the resource server 110. In some embodiments, the request may be received from the resource service 112 by the management service 132 executed by the management server 130. Additionally or alternatively, the request may be received from the resource service 112 by the agent application 152 executed by the user device 150. In any case, the request may be received via a communicative coupling established with the remote server 110 to which the user device 150 is communicatively coupled, which may have been established in stage 405.

In certain embodiments, the request to determine whether the user device 150 communicatively coupled to the resource server 110 is authorized to access resources 258 hosted by the resource server 110 may include a management identifier 256, which may have been issued to the user device 150 amongst the operations of stage 410. Additionally, the request may include a device profile 252 associated with the user device 150. Moreover, the request may include user data 254 associated with a user of the user device 150. In any case, the request and/or data included therein may provide a basis, at least in part, for determining whether the user device 150 communicatively coupled to the remote server 110 is authorized to access resources 258 hosted by the remote server 110.

Then, in stage 420, a determination of whether the user device 150 communicatively coupled to the resource server 110 is authorized to access resources 258 hosted by the resource server 110 is made. While stage 420 will be described in further detail with regard to FIG. 7, in certain embodiments, the determination of whether the user device 150 communicatively coupled to the resource server 110 is authorized to access resources 258 hosted by the resource server 110 may be predicated based on whether the user device 150 has been issued a management identifier 256. Additionally or alternatively, the determination of whether the user device 150 communicatively coupled to the resource server 110 is authorized to access resources 258 hosted by the resource server 110 may be predicated based on whether the user device 150 satisfies certain compliance rules 260.

Responsive to a determination in stage 420 that the user device 150 communicatively coupled to the resource server 110 is authorized to access resources 258 hosted by the resource server 110, the process may proceed to stage 425. In stage 425, a response indicating that the user device 150 communicatively coupled to the resource server 110 is authorized to access resources 258 hosted by the resource server 110 may be provided.

In certain embodiments, the response indicating that the user device 150 communicatively coupled to the resource server 110 is authorized to access resources 258 hosted by the resource server 110 may be provided to the resource service 112 executed by the resource server 110. In some embodiments, the response may be provided to the resource service 112 by the management service 132 executed by the management server 130. Additionally or alternatively, the response may be provided to the resource service 112 by the agent application 152 executed by the user device 150. In any case, the response may be provided via a communicative coupling established with the remote server 110 to which the user device 150 is communicatively coupled, which may have been established in stage 405.

In certain embodiments, the response indicating that the user device 150 communicatively coupled to the resource server 110 is authorized to access resources 258 hosted by the resource server 110 may include an indication that the user device 150 has been issued a management identifier 256. Additionally or alternatively, the response may include an indication that a management identifier 256 that has been issued to the user device 150 is a valid and/or authentic management identifier 256. In some embodiments, the response may further indicate that the user device 150 satisfies certain compliance rules 260 required for the user device 150 to be authorized to access resources 258 hosted by the resource server 110.

In certain embodiments, the response indicating that the user device 150 communicatively coupled to the resource server 110 is authorized to access resources 258 hosted by the resource server 110 may specify certain resources 258 that the user device 150 is authorized to access. For instance, the response may specify that the user device 150 is authorized to access certain resources 258 specific to an enterprise associated with the user device 150. In some embodiments, the response may further specify certain resources 258 that the user device is not authorized to access. For example, the response may specify that the user device 150 is only authorized to access certain resources 258 specific to an enterprise associated with the user device 150 and not certain resources 258 that are associated with enterprises that are not associated with the user device 150. Additionally, in certain embodiments, the response may indicate the basis for why the user device 150 is authorized to access certain resources 258 and/or the basis for why the user device 150 is not authorized to access certain resources 258. For instance, the response may specify that the user device 150 is not authorized to access certain resources 258 because while the user device 150 was issued a valid management identifier 256 the user device 150 does not comply with certain compliance rules 258. Thus, the response may include granular indications of which resources 258 the user device 150 is authorized to access and granular indications of why the user device 150 is and/or is not authorized to access certain resources 258. Once a response indicating that the user device 150 communicatively coupled to the resource server 110 is authorized to access resources 258 hosted by the resource server 110 is provided, the stages of FIG. 4 may end.

Returning to stage 420, responsive to a determination in stage 420 that the user device 150 communicatively coupled to the resource server 110 is not authorized to access resources 258 hosted by the resource server 110, the process may proceed to stage 430. In stage 425, a response indicating that the user device 150 communicatively coupled to the resource server 110 is not authorized to access resources 258 hosted by the resource server 110 may be provided.

In certain embodiments, the response indicating that the user device 150 communicatively coupled to the resource server 110 is not authorized to access resources 258 hosted by the resource server 110 may be provided to the resource service 112 executed by the resource server 110. In some embodiments, the response may be provided to the resource service 112 by the management service 132 executed by the management server 130. Additionally or alternatively, the response may be provided to the resource service 112 by the agent application 152 executed by the user device 150. In any case, the response may be provided via a communicative coupling established with the remote server 110 to which the user device 150 is communicatively coupled, which may have been established in stage 405.

In certain embodiments, the response indicating that the user device 150 communicatively coupled to the resource server 110 is not authorized to access resources 258 hosted by the resource server 110 may include an indication that the user device 150 has not been issued a management identifier 256. Additionally or alternatively, the response may include an indication that a management identifier 256 that has been issued to the user device 150 is not a valid and/or authentic management identifier 258. In some embodiments, the response may further indicate that the user device 150 does not satisfy certain compliance rules 260 required for the user device 150 to be authorized to access resources 258 hosted by the resource server 110.

In certain embodiments, the response indicating that the user device 150 communicatively coupled to the resource server 110 is authorized to access resources 258 hosted by the resource server 110 may specify certain resources 258 that the user device 150 is not authorized to access. For instance, the response may specify that the user device 150 is not authorized to access certain resources 258 specific to an enterprise that is not associated with the user device 150. In some embodiments, the response may further specify certain resources 258 that the user device is authorized to access. For example, the response may specify that the user device 150 is only authorized to access certain resources 258 specific to an enterprise associated with the user device 150 and not certain resources 258 that are associated with enterprises that are not associated with the user device 150. Additionally, in certain embodiments, the response may indicate the basis for why the user device 150 is not authorized to access certain resources 258 and/or the basis for why the user device 150 is authorized to access certain resources 258. For instance, the response may specify that the user device 150 is not authorized to access certain resources 258 because while the user device 150 was not issued a valid management identifier 256 the user device 150 does comply with certain compliance rules 258. Thus, the response may include granular indications of which resources 258 the user device 150 is not authorized to access and granular indications of why the user device 150 is not and/or is authorized to access certain resources 258. Once a response indicating that the user device 150 communicatively coupled to the resource server 110 is not authorized to access resources 258 hosted by the resource server 110 is provided, the stages of FIG. 4 may end.

Optionally, in stage 435, at least one remedial action may be caused to be performed following the providing of the indication that the user device 150 communicatively coupled to the resource server 110 is not authorized to access resources 258 hosted by the resource server 110. In certain embodiments, causing remedial actions to be performed may include performing the remedial actions, such as by pushing configuration profiles to the user device 150 that perform actions on the user device 150. In some embodiments, causing remedial actions to be performed may include instructing another party, and/or element of operating environment 100, to perform the remedial actions, such as by instructing the agent application 152 executed by the user device 150 to perform certain actions on the user device 150.

In any case, in certain embodiments, remedial actions may include causing the user device 150 communicatively coupled to the resource server 110 to become authorized to access the resources 258 hosted by the resource server 110. Depending on the conditions required for being authorized to access the resources 258 hosted by the resource server 110, one or more remedial actions may required to place the user device 150 in an authorized state. For instance, the user device 150 communicatively coupled to the resource server 110 may become managed by the management service 132 executed by the management server 130, such as by enrolling the user device 150 into the management service 132. Additionally or alternatively, the user device 150 communicatively coupled to the resource server 110 may be issued a management identifier 258, such as through enrollment of the user device 150 into the management service 132.

Further, additionally or alternatively, the user device 150 communicatively coupled to the resource server 110 may be modified so that the user device 150 satisfies certain compliance rules 260. More specifically, the user device 150 may be configured and/or instructed over the air, such as via API calls to the operating system 215 of the user device 150 and/or the agent application 152 executed by the user device 150, in such a manner that the conditions of the compliance rules 258 become satisfied. As an example, certain hardware settings, such as location services settings, might be modified, such as toggling location services to disabled, by transmitting a configuration profile from the management service 132 to the user device 150 that places the user device 150 in a state that satisfies a compliance rule 260, such as a compliance rule 260 that prohibits having location services enabled. Once the remedial actions are caused to be performed, the stages of FIG. 4 may end.

A real-world example involving securely authorizing access to remote resources may be useful to understand the above concepts. An employee of an enterprise may be provided a smartphone for use within her employment. The IT policy at the enterprise may require that smartphones used for enterprise purposes be managed by a management service 132 administrated by the IT team of the enterprise. When the smartphone is provided to the employee, the IT team may enroll the smartphone into the management service 132 to satisfy the IT policy. As a part of using the smartphone for enterprise purposes, the employee may need to utilize a resource access application 154 that relies on certain resources 258 hosted by a cloud-based resource server 110. The cloud-based resource server 110 may not know whether the smartphone is authorized to access the hosted resource 258 and/or may have been instructed to rely on the management service's 132 determination of whether the smartphone is authorized to access the hosted resources 258.

Accordingly, the cloud-based resource server 110 may request that the management service 132 make a determination of whether the smartphone is authorized to access the hosted resources 258. The management service 132 may determine whether the smartphone has been issued a management identifier 256, which may have occurred during enrollment of the smartphone into the management service 132. More specifically, the management service 132 may query its management record store 136 to identify a management record associated with the smartphone and determine whether it contains the management identifier. Additionally or alternatively, if the smartphone provided the cloud-based resource server 110 with a management identifier when requesting to access the hosted resources 258, then the management service 132 may request that the cloud-based resource server 110 provide the management identifier to the management service 132 for validation. Depending on the requirements for authorization configured by the IT team administrating the management service 132, the management service 132 may further make a determination of whether the smartphone satisfies compliance rules 260 configured by the IT team administrating the management service 132.

In response to the management service 132 confirming that the smartphone is authorized to access the hosted resources 258, the management service 132 may notify the cloud-based resource server 110 that the smartphone is authorized. In such a scenario, the cloud-based resource server 110 may rely on the confirmation of authorization provided by the management service 132 in proceeding to transmit the hosted resources 258 to the smartphone for use in its execution of the resource access application 154. On the contrary, in response to the management service 132 deciding that the smartphone is not authorized to access the hosted resources 258, the management service 132 may notify the cloud-based resource server 110 that the smartphone is not authorized. In such a scenario, the cloud-based resource server 110 may rely on the denial of authorization provided by the management service 132 in denying the transmission of the hosted resources 258 to the smartphone. Additionally, the management service 132 may reconfigure the smartphone by transmitting configuration policies and/or instructions to the smartphone that modify the smartphone in a manner which makes the smartphone authorized, at which time the cloud-based resource server 110 may be further notified that the smartphone has been made authorized and which may trigger a transmission of the hosted resources 258 from the cloud-based resource server 110 to the smartphone for using in its execution of the resource access application 154.

Figure 5:
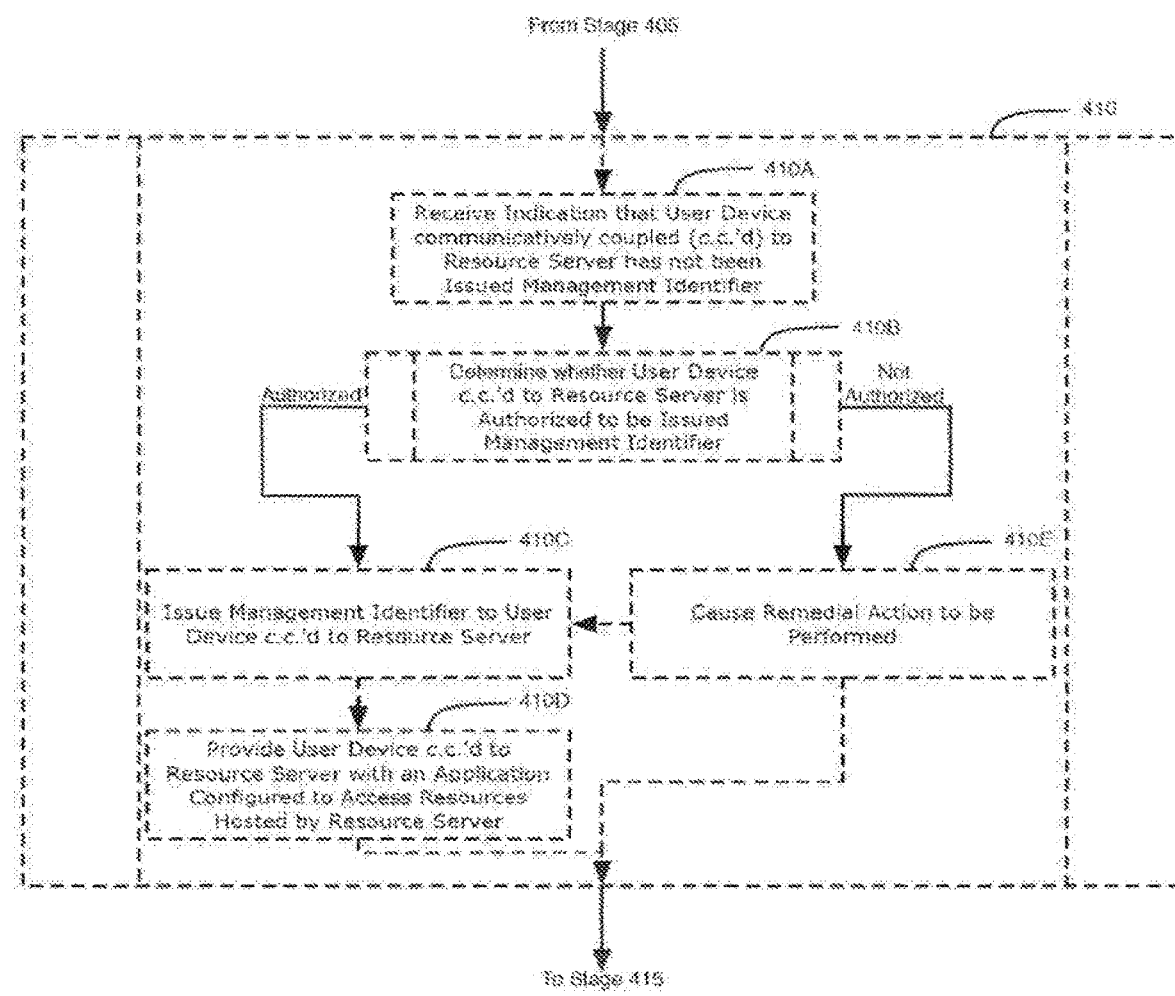

Having thus described various functionality that may be provided in association with a compliance server 130 and/or a resource server 110, attention will be turned to FIG. 5 to discuss corresponding functionality that may be provided in association with a user device 150. In this regard, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 5, namely stages 410A, 410B, 410C, 410D, and 410E. In certain embodiments, at least one stage of FIG. 5 may be performed by the management server 130, such as via the management service 132 executed by the management server 130. Additionally or alternatively, at least one stage of FIG. 5 may be performed by the user device 150, such as via the agent application 152 executed by the user device 150.

As previously stated, FIG. 5 provides a detailed description of the sub-operations of stage 410 of FIG. 4, which provided initial management of the user device 150 communicatively coupled to the resource server 110. Beginning with stage 410A, an indication that the user device 150 communicatively coupled to the resource server 110 has not been issued a management identifier 256 may be received. In certain embodiments, the indication that the user device 150 communicatively coupled to the resource server 110 has not been issued a management identifier 256 may be received from the resource service 112 executed by the resource server 110. In some embodiments, the request may be received from the resource service 112 by the management service 132 executed by the management server 130. For instance, the resource service 112 may determine that a request transmitted by the user device 150 for access to resources 258 did not include a management identifier 256, and may provide such information to the management service 132 so that the management service 132 may determine whether it should issue a management identifier 256 to the user device 150. Additionally or alternatively, the request may be received from the resource service 112 by the agent application 152 executed by the user device 150. In any case, the request may be received via a communicative coupling established with the remote server 110 to which the user device 150 is communicatively coupled, which may have been established in stage 405 of FIG. 4.

In certain embodiments, the indication that the user device 150 communicatively coupled to the resource server 110 has not been issued a management identifier 256 may include a device profile 252 associated with the user device 150. Moreover, the indication may include user data 254 associated with a user of the user device 150. In any case, the indication and/or data included therein may provide a basis, at least in part, for determining whether the user device 150 communicatively coupled to the remote server 110 is authorized to be issued a management identifier 256.

Then, in stage 410B, a determination of whether the user device 150 communicatively coupled to the resource server 110 is authorized to be issued a management identifier 256 is made. While stage 410B will be described in further detail with regard to FIG. 6, in certain embodiments, the determination of whether the user device 150 communicatively coupled to the resource server 110 is authorized to be issued a management identifier 256 may be predicated based on whether the user device 150 is managed, such as by the management service 132 executed by the management server 130. Additionally or alternatively, the determination of whether the user device 150 communicatively coupled to the resource server 110 is authorized to be issued a management identifier 256 may be predicated based on whether the user device 150 satisfies certain compliance rules 260.

Responsive to a determination in stage 410B that the user device 150 communicatively coupled to the resource server 110 is authorized to be issued a management identifier 256, the process may proceed to stage 410C. In stage 410C, a management identifier 256 is issued to the user device 150 communicatively coupled to the resource server 110. In certain embodiments, issuing a management identifier 256 to the user device 150 may include generating the management identifier 256. As previously described, the management identifier 256 may be generated at least in part based on an element distinct from the user device 150, such as a random number, so that the user device 150 cannot replicate the management identifier 256 without the assistance of the issuer of the management identifier 256. In some embodiments, the management service 132 executed by the management server 130 may generate the management identifier 256 for the user device 150. For instance, the management identifier 256 may be issued to and/or generated for the user device 150 during enrollment of the user device 150 into the management service 132. In some embodiments, the agent application 152 executed by the user device 150 may generate the management identifier 256 for the user device 150.

In certain embodiments, the management identifier 256 issued to the user device 150 may be stored and/or logged in the management identifier store 136 of the management server 130. Additionally or alternatively, issuing a management identifier 256 to the user device 150 may include adding the management identifier 256 to a management record associated with the user device 150, such as within the management record store 134. Yet additionally or alternatively, the user device 150 communicatively coupled to the resource server 110 may be provided with access to the management identifier 258 issued to the user device 150. For instance, the management identifier 258 may be provided to the resource access application 154 executed by the user device 150 such that the resource access application 154 may include the management identifier 258 in requests for access to resources 258 hosted by the resource server 110. Once a management identifier 256 is issued to the user device 150 communicatively coupled to the resource server 110, the stages of FIG. 5 may end, such as by proceeding to stage 415.

Optionally, then in stage 410D, the user device 150 communicatively coupled to the resource server 110 may be provided with an application configured to access resources 258 hosted by the resource server 110. In certain embodiments, the application configured to access resources 258 hosted by the resource server 110 may include the resource access application 154. In some embodiments, the user device 150 may be provided with the resource access application 154, such as via a download from an application store. Additionally or alternatively, the resource access application 154 may be configured to access resources 258 hosted by the resource server 110. For example, an application configuration profile may be provided to the user device 150 that enables the resource access application 154 to establish a communicative coupling with the resource service 112 executed by the resource server 110. In some instances, the application configuration profile may be transmitted via the application configuration channel supported by Apple iOS7. Once the user device 150 communicatively coupled to the resource server 110 is provided with an application configured to access resources 258 hosted by the resource server 110, the stages of FIG. 5 may end, such as by proceeding to stage 415.

Returning to stage 410B, responsive to a determination in stage 410B that the user device 150 communicatively coupled to the resource server 110 is not authorized to be issued a management identifier 256, the process may proceed to stage 410E. In stage 410E, at least one remedial action may be caused to be performed. In certain embodiments, causing remedial actions to be performed may include performing the remedial actions, such as by pushing configuration profiles to the user device 150 that perform actions on the user device 150. In some embodiments, causing remedial actions to be performed may include instructing another party, and/or element of operating environment 100, to perform the remedial actions, such as by instructing the agent application 152 executed by the user device 150 to perform certain actions on the user device 150.

In any case, in certain embodiments, remedial actions may include causing the user device 150 communicatively coupled to the resource server 110 to become authorized to access the resources 258 hosted by the resource server 110. Depending on the conditions required for being authorized to access the resources 258 hosted by the resource server 110, one or more remedial actions may required to place the user device 150 in an authorized state. For instance, the user device 150 communicatively coupled to the resource server 110 may become managed by the management service 132 executed by the management server 130, such as by enrolling the user device 150 into the management service 132. Additionally or alternatively, the user device 150 communicatively coupled to the resource server 110 may be issued a management identifier 256, such as through enrollment of the user device 150 into the management service 132.

Further, additionally or alternatively, the user device 150 communicatively coupled to the resource server 110 may be modified so that the user device 150 satisfies certain compliance rules 260. More specifically, the user device 150 may be configured and/or instructed over the air, such as via API calls to the operating system 215 of the user device 150 and/or the agent application 152 executed by the user device 150, in such a manner that the conditions of the compliance rules 258 become satisfied. As an example, certain software settings, such as encryption settings, might be modified, such as toggling encryption to enabled, by transmitting a configuration profile from the management service 132 to the user device 150 that places the user device 150 in a state that satisfies a compliance rule 260, such as a compliance rule 260 that requires having encryption enabled. Once the remedial actions are caused to be performed, the stages of FIG. 5 may end, such as by proceeding to stage 415.

Figure 6:
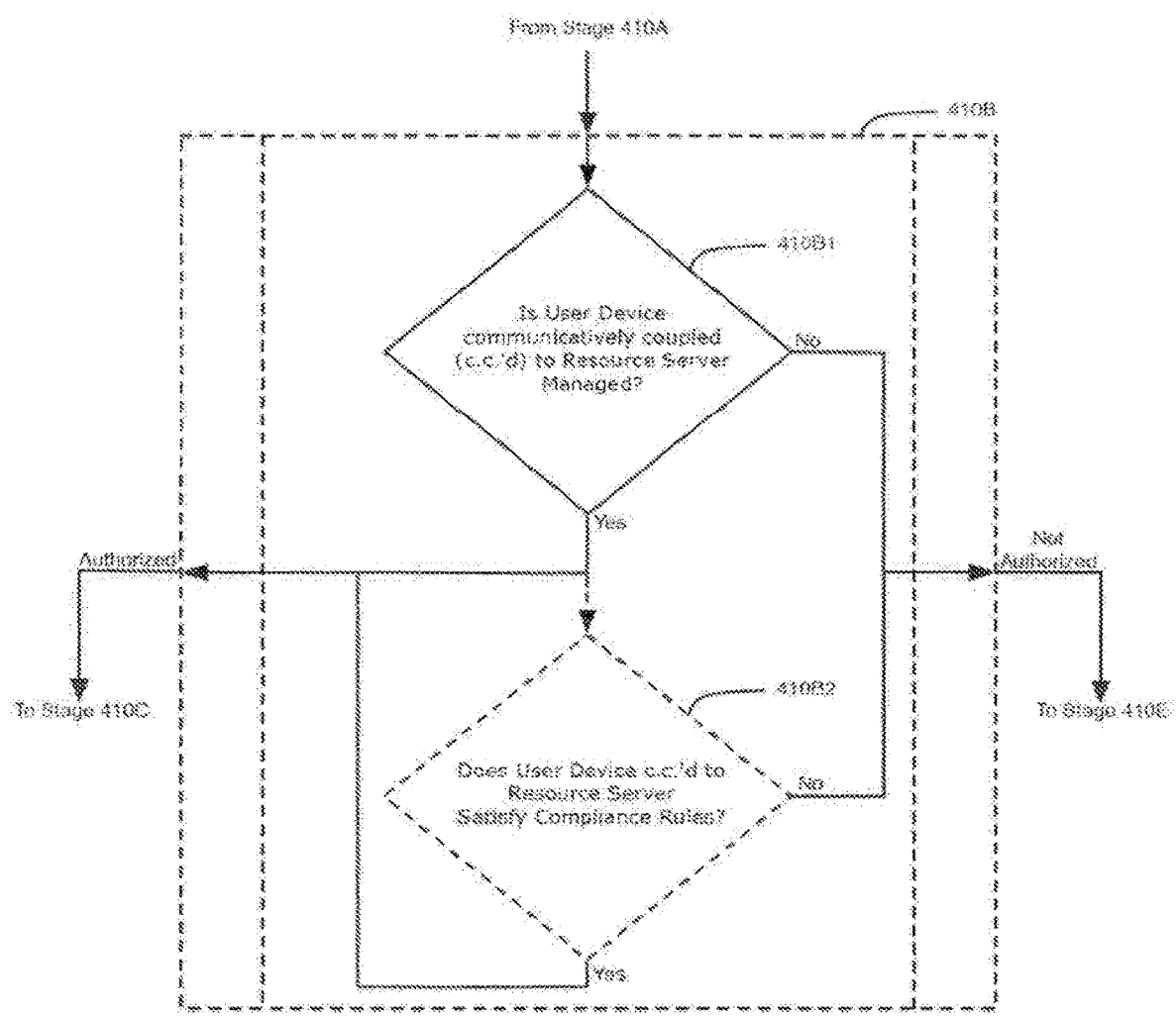

Having thus described various functionality that may be provided in association with a compliance server 130 and/or a resource server 110, attention will be turned to FIG. 6 to discuss corresponding functionality that may be provided in association with a user device 150. In this regard, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 6, namely stages 410B1 and 410B2. In certain embodiments, at least one stage of FIG. 6 may be performed by the management server 130, such as via the management service 132 executed by the management server 130. Additionally or alternatively, at least one stage of FIG. 6 may be performed by the user device 150, such as via the agent application 152 executed by the user device 150.

As previously stated, FIG. 6 provides a detailed description of the sub-operations of stage 410B of FIG. 5, which determined whether the user device 150 communicatively coupled to the resource server 110 is authorized to be issued a management identifier 256. Beginning with stage 410B1, a determination of whether the user device 150 communicatively coupled to the resource server 110 is managed is made. In certain embodiments, the user device 150 communicatively coupled to the resource server 110 may be managed by the management service 132 executed by the management server 130. In some embodiments, the user device 150 may be managed by the management service 132 if the user device 150 is enrolled into the management service 132. Additionally or alternatively, the user device 150 may be managed by the management service 132 if an agent application 152 executed by the user device 150 is communicatively coupled to the management service 132. Once the determination of whether the user device 150 communicatively coupled to the resource server 110 is authorized to be issued a management identifier 256 is made, the stages of FIG. 6 may end, such as by proceeding to stage 410C if the user device 150 is authorized to be issued a management identifier 256 or by proceeding to stage 410E if the user device 150 is not authorized to be issued a management identifier 256.

Optionally, next in stage 410B2, a determination of whether the user device 150 communicatively coupled to the resource server 110 satisfies certain compliance rules 260 is made. In certain embodiments, the management service 132 executed by the management server 130 may make the determination of whether the user device 150 satisfies the compliance rules 260. In some embodiments, the agent application 152 executed by the user device 150 may make the determination of whether the user device 150 satisfies the compliance rules 260. In any case, the determination of whether the user device 150 satisfies the compliance rules 260 may be made based at least in part on whether the device profile 252 associated with the user device 150 indicates that the user device 150 satisfies the conditions required for the compliance rules 260 to be satisfied. Additionally or alternatively, the determination of whether the user device 150 satisfied the compliance rules 260 may be made based at least in part on whether the user data 254 associated with a user of the user device 1509 indicates that the user of the user device 150 satisfies the conditions required for the compliance rules 260 to be satisfied. Once the determination of whether the user device 150 communicatively coupled to the resource server 110 is authorized to be issued a management identifier 256 is made, the stages of FIG. 6 may end, such as by proceeding to stage 410C if the user device 150 is authorized to be issued a management identifier 256 or by proceeding to stage 410E if the user device 150 is not authorized to be issued a management identifier 256.

Figure 7:
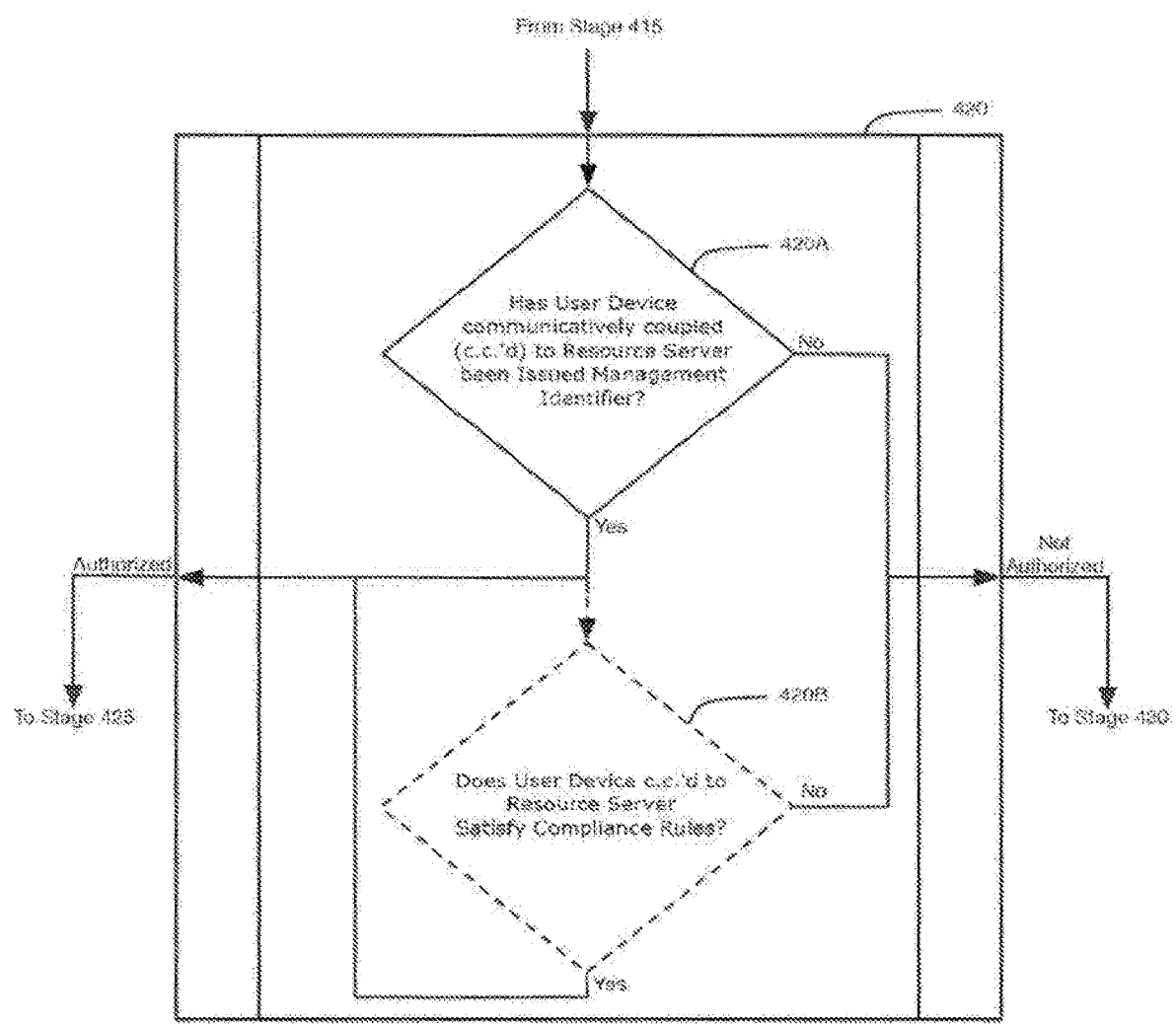

Having thus described various functionality that may be provided in association with a compliance server 130 and/or a resource server 110, attention will be turned to FIG. 7 to discuss corresponding functionality that may be provided in association with a user device 150. In this regard, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 7, namely stages 420A and 420B. In certain embodiments, at least one stage of FIG. 7 may be performed by the management server 130, such as via the management service 132 executed by the management server 130. Additionally or alternatively, at least one stage of FIG. 7 may be performed by the user device 150, such as via the agent application 152 executed by the user device 150.

As previously stated, FIG. 7 provides a detailed description of the sub-operations of stage 420 of FIG. 4, which determined whether the user device 150 communicatively coupled to the resource server 110 is authorized to access resources 258 hosted by the resource server 100. Beginning with stage 410B1, a determination of whether the user device 150 communicatively coupled to the resource server 110 has been issued a management identifier 256 is made. In certain embodiments, the user device 150 communicatively coupled to the resource server 110 may have been issued a management identifier 256 if the user device 150 is enrolled into the management service 132 executed by the management server 130, as a management identifier 258 may have been issued to the user device 150 during enrollment into the management service 132. In some embodiments, the management identifier store 136 of the management server 130 may be queried to determine whether a management identifier 256 associated with the user device 150 is stored therein. Additionally or alternatively, the management record store 134 of the management server 130 may be queried to determine whether a management identifier 256 is included in a management record associated with the user device 150 stored therein. Once the determination of whether the user device 150 communicatively coupled to the resource server 110 is authorized to be access resources 258 hosted by the resource server 110 is made, the stages of FIG. 7 may end, such as by proceeding to stage 425 if the user device 150 is authorized to be access resources 258 hosted by the resource server 110 or by proceeding to stage 430 if the user device 150 is not authorized to be access resources 258 hosted by the resource server 110.

Optionally, next in stage 420B, a determination of whether the user device 150 communicatively coupled to the resource server 110 satisfies certain compliance rules 260 is made. In certain embodiments, the management service 132 executed by the management server 130 may make the determination of whether the user device 150 satisfies the compliance rules 260. In some embodiments, the agent application 152 executed by the user device 150 may make the determination of whether the user device 150 satisfies the compliance rules 260. In any case, the determination of whether the user device 150 satisfies the compliance rules 260 may be made based at least in part on whether the device profile 252 associated with the user device 150 indicates that the user device 150 satisfies the conditions required for the compliance rules 260 to be satisfied. Additionally or alternatively, the determination of whether the user device 150 satisfied the compliance rules 260 may be made based at least in part on whether the user data 254 associated with a user of the user device 1509 indicates that the user of the user device 150 satisfies the conditions required for the compliance rules 260 to be satisfied. Once the determination of whether the user device 150 communicatively coupled to the resource server 110 is authorized to be access resources 258 hosted by the resource server 110 is made, the stages of FIG. 7 may end, such as by proceeding to stage 425 if the user device 150 is authorized to be access resources 258 hosted by the resource server 110 or by proceeding to stage 430 if the user device 150 is not authorized to be access resources 258 hosted by the resource server 110.

Figure 8:
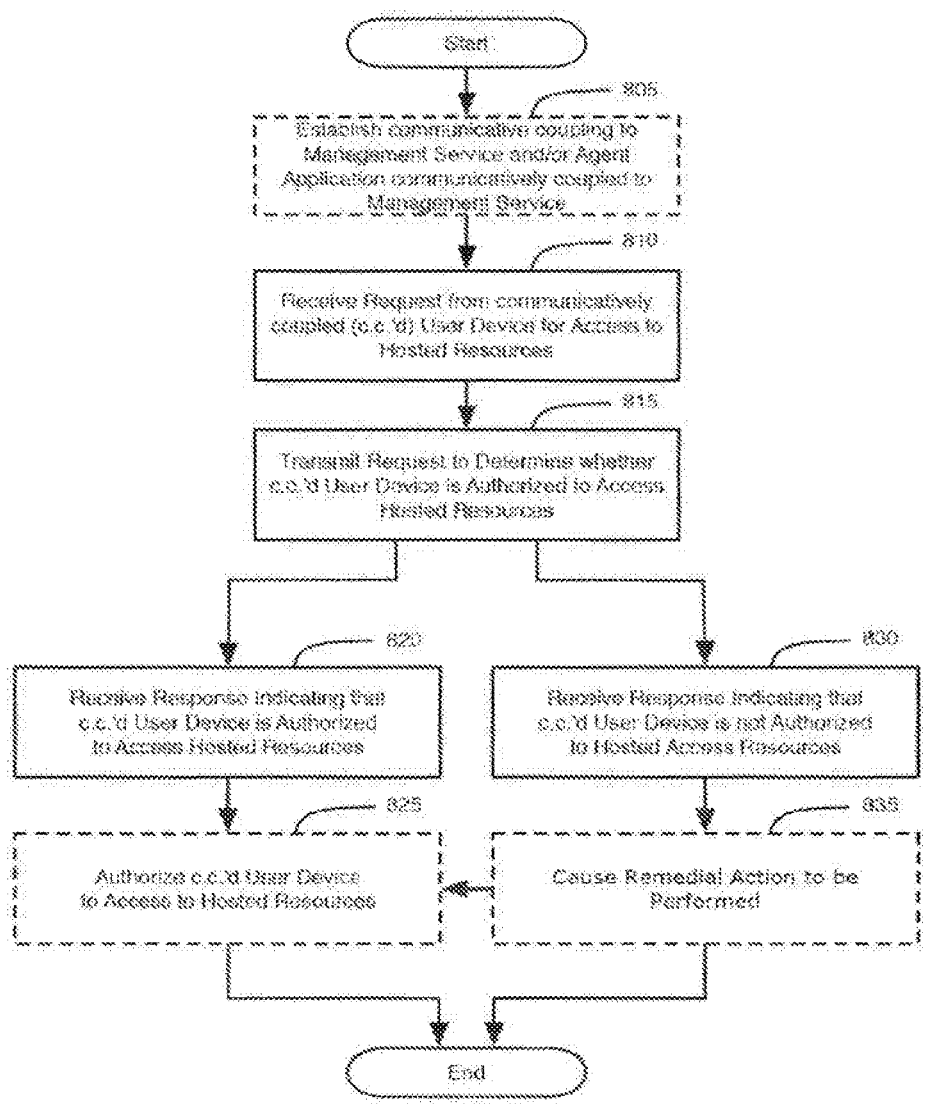

Having thus described various functionality that may be provided in association with a compliance server 130 and/or a resource server 110, attention will be turned to FIG. 8 to discuss corresponding functionality that may be provided in association with a user device 150. In this regard, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 8, namely stages 805, 810, 815, 820, 825, 830, and 835. In certain embodiments, at least one stage of FIG. 8 may be performed by the resource server 110, such as via the resource service 112 executed by the resource server 110.

Optionally beginning with stage 805, a communicative coupling to a management service 132 executed by a management server 130 may be established. Additionally or alternatively, a communicative coupling to an agent application 152 executed by a user device 150 may be established. In any case, the communicative coupling may be established via a secure communication channel over the network 140, such as HTTPS and/or the like. The communicative coupling may be established via APIs specific to the resource service 112, such that the management service 132 and/or agent application 152 may communicate with and/or transmit instructions to the resource service 112. Additionally and/or alternatively, the communicative coupling may be established via APIs specific to the management service 132 and/or agent application 152, such that the resource service 112 may communicate with and/or transmit instructions to the management service 132 and/or agent application 152. Data transmitted via the communicative coupling may be encrypted, for instance using AES-256 encryption, to ensure that the data in transit over the communicative coupling cannot be intercepted and deciphered by a malicious application and/or device.

Then, in stage 810, a request for access to hosted resources 258 may be received from a communicatively coupled user device 150. In certain embodiments, the request for access to hosted resources 258 may be a general request for resources 258, such that the user device 150 seeks access to resources 258 that the resource service 110 determines are appropriate for the user device 150. In some embodiments, the request for access to hosted resources 258 may be a specific request for resources 258, such that the request designates which resources 258 the user device 150 seeks to access. In any case, the request may include a management identifier 256 that has been issued to the user device 150. Additionally or alternatively, the request may include a device profile 252 associated with the user device 150 and/or user data 254 associated with a user of the user device 150, which may be relied upon to determine whether the user device 150 satisfies certain compliance rules 260.

Next, in stage 815, a request to determine whether the user device 150 is authorized to access the hosted resources 258 may be transmitted. In certain embodiments, the request to determine whether the user device 150 is authorized to access the hosted resources 258 may be transmitted to the management service 132 executed by the management server 130. In some embodiments, the request to determine whether the user device 150 is authorized to access the hosted resources 258 may be transmitted to the agent application 152 executed by the user device 150. In any case, the request may include a management identifier 256 that has been issued to the user device 150. Additionally or alternatively, the request may include a device profile 252 associated with the user device 150 and/or user data 254 associated with a user of the user device 150, which may be relied upon to determine whether the user device 150 satisfies certain compliance rules 260.

Depending on the outcome of the determination of whether the user device 150 communicatively coupled to the resource server 110 is authorized to access the hosted resources 258, the process may proceed from stage 815 to one of stage 820 or stage 830. If it is determined that the user device 150 is authorized to access the hosted resources 258, the process may proceed to stage 820. On the contrary, if it is determined that the user device 150 is authorized to access the hosted resources 258, the process may proceed to stage 830.

In embodiments where it is determined that the user device 150 communicatively coupled to the resource server 110 is authorized to access hosted resources 258, the process may proceed to stage 820 where a response indicating that the user device 150 is authorized to access the hosted resources 258 may be received. In certain embodiments, the response indicating that the user device 150 is authorized to access the hosted resources 258 may be received from the management service 132 executed by the management service 130. In some embodiments, the response indicating that the user device 150 is authorized to access the hosted resources 258 may be received from the agent application 152 executed by the user device 150. In any case, the response indicating that the user device 150 is authorized to access the hosted resources 258 may include an indication of why the user device 150 is authorized. For instance, the indication may specify that the user device 150 was issued a management identifier 258. Additionally or alternatively, the indication may specify that state of the user device 150 satisfies certain compliance rules 260. Once the response indicating that the user device 150 communicatively coupled to the resource server 110 is authorized to access the hosted resources 258 is received, the stages of FIG. 8 may end.

Optionally, subsequently in embodiments where it is determined that the user device 150 communicatively coupled to the resource server 110 is authorized to access hosted resources 258, the process may proceed to stage 825 where the user device 150 communicatively coupled to the resource server 110 may be authorized to access the hosted resources 258. In certain embodiments, the user device 150 communicatively coupled to the resource server 110 may be authorized to access the hosted resources 258 by providing the user device 150 communicatively coupled to the resource server 110 with access to the hosted resources 258. For instance, the hosted resources 258 may be transmitted to the user device 150 communicatively coupled to the resource server 110 over the network 140. In some embodiments, the user device 150 communicatively coupled to the resource server 110 may be authorized to access the hosted resources 258 by instructing an agent application 152 on the user device 150 to download the hosted resource 258 from the resource server 110. Once the user device 150 communicatively coupled to the resource server 110 is authorized to access the hosted resources 258, the stages of FIG. 8 may end.

Returning to stage 815, in embodiments where it is determined that the user device 150 communicatively coupled to the resource server 110 is not authorized to access hosted resources 258, the process may proceed to stage 820 where a response indicating that the user device 150 is not authorized to access the hosted resources 258 may be received. In certain embodiments, the response indicating that the user device 150 is not authorized to access the hosted resources 258 may be received from the management service 132 executed by the management service 130. In some embodiments, the response indicating that the user device 150 is not authorized to access the hosted resources 258 may be received from the agent application 152 executed by the user device 150. In any case, the response indicating that the user device 150 is not authorized to access the hosted resources 258 may include an indication of why the user device 150 is not authorized. For instance, the indication may specify that the user device 150 was not issued a management identifier 256. Additionally or alternatively, the indication may specify that state of the user device 150 does not satisfy certain compliance rules 260. Once the response indicating that the user device 150 communicatively coupled to the resource server 110 is not authorized to access the hosted resources 258, the stages of FIG. 8 may end.

Optionally, subsequently in embodiments where it is determined that the user device 150 communicatively coupled to the resource server 110 is not authorized to access hosted resources 258, the process may proceed to stage 835 where certain remedial actions may be caused to be performed. In certain embodiments, causing remedial actions to be performed may include performing the remedial actions, such as by pushing configuration profiles to the user device 150 that perform actions on the user device 150. In some embodiments, causing remedial actions to be performed may include instructing another party, and/or element of operating environment 100, to perform the remedial actions, such as by instructing the agent application 152 executed by the user device 150 to perform certain actions on the user device 150.

In any case, in certain embodiments, remedial actions may include causing the user device 150 communicatively coupled to the resource server 110 to become authorized to access the resources 258 hosted by the resource server 110. Depending on the conditions required for being authorized to access the resources 258 hosted by the resource server 110, one or more remedial actions may required to place the user device 150 in an authorized state. For instance, the user device 150 communicatively coupled to the resource server 110 may become managed by the management service 132 executed by the management server 130, such as by enrolling the user device 150 into the management service 132. Additionally or alternatively, the user device 150 communicatively coupled to the resource server 110 may be issued a management identifier 256, such as through enrollment of the user device 150 into the management service 132.

Further, additionally or alternatively, the user device 150 communicatively coupled to the resource server 110 may be modified so that the user device 150 satisfies certain compliance rules 260. More specifically, the user device 150 may be configured and/or instructed over the air, such as via API calls to the operating system 215 of the user device 150 and/or the agent application 152 executed by the user device 150, in such a manner that the conditions of the compliance rules 258 become satisfied. As an example, certain application settings, such as containerization settings, might be modified, such as toggling containerization to enabled, by transmitting a configuration profile from the management service 132 to the user device 150 that places the user device 150 in a state that satisfies a compliance rule 280, such as a compliance rule 260 that requires having containerization of resources 258 enabled. In some embodiments, once the remedial actions are caused to be performed, the process may proceed to stage 825 where the user device 150 is authorized to access the hosted resources 258. Alternatively, once the remedial actions are caused to be performed, the stages of FIG. 8 may end.

Figure 9:
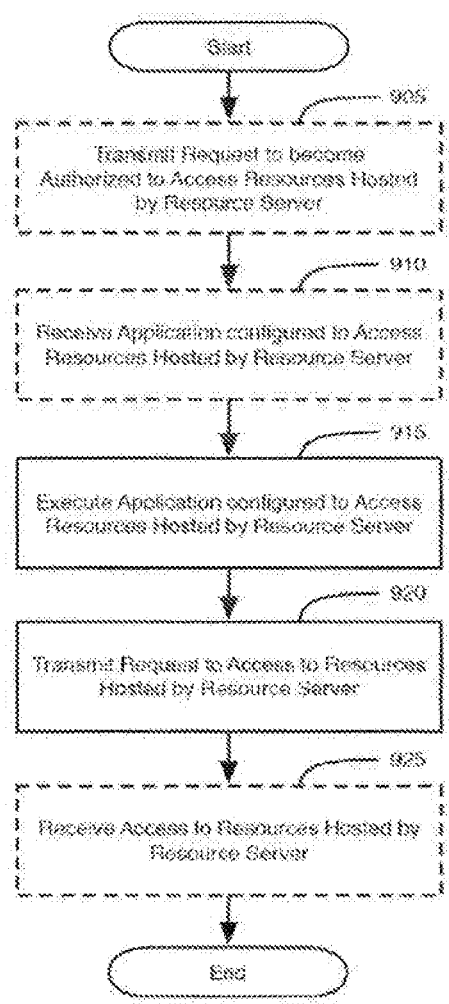

Having thus described various functionality that may be provided in association with a compliance server 130 and/or a resource server 110, attention will be turned to FIG. 9 to discuss corresponding functionality that may be provided in association with a user device 150. In this regard, the apparatus 300 embodied by or otherwise associated with the management server 130, resource server 110, and/or user device 150 may, according to some example embodiments, include means, such as the processor 302, the memory 304, the communication interface 306, and/or the like, for executing the operations ("stages") of FIG. 9, namely stages 905, 910, 915, 920, and 925. In certain embodiments, at least one stage of FIG. 9 may be performed by the user device 150. In some embodiments, at least one stage of FIG. 9 may be performed via the agent application 152 executed by the user device 150. Additionally or alternatively, at least one stage of FIG. 9 may be performed via the resource access application 154 executed by the user device 150.

Optionally beginning with stage 905, a request to become authorized to access resources 258 hosted by the resource server 110 may be transmitted. In certain embodiments, the request may be transmitted to the resource server 110, such as to the resource service 112 executed by the resource server 110. In some embodiments, the request may be transmitted to the management server 130, such as to the management service 132 executed by the management server 130. In any case, the request may include a device profile 252 associated with the user device 150 and/or user data 254 associated with a user of the user device 150, which may be relied upon to determine whether the user device 150 satisfies certain compliance rules 260. Additionally or alternatively, the request may include a request to become managed by the management service 132 executed by the management server 130.

Optionally next in stage 910, an application configured to access resources 258 hosted by the resource server 110 may be received. In certain embodiments, the application configured to access resources 258 hosted by the resource server 110 may include the resource access application 154. In some embodiments, the resource access application 154 may be received via a download from an application store. Additionally or alternatively, the resource access application 154 may be configured to access resources 258 hosted by the resource server 110. For example, an application configuration profile may be provided that enables the resource access application 154 to establish a communicative coupling with the resource service 112 executed by the resource server 110. In some instances, the application configuration profile may be transmitted via the application configuration channel supported by Apple iOS7.

Next, in stage 915, an application configured to access resources 258 hosted by the resource server 110 may be executed. As described herein, the application configured to access resources 258 hosted by the resource server 110 may include the resource access application 154. In certain embodiments, the application configured to access resources 258 hosted by the resource server 110 may be executed by installing the application, such as once the application is received in stage 910. In some embodiments, the application configured to access resources 258 hosted by the resource server 110 may be executed by launching the application and/or running the application, which may be accomplished via a processor reading from a memory wherein the application is stored.

Then, in stage 920, a request to access resources 258 hosted by the resource server 110 may be transmitted. In certain embodiments, the request to access resources 258 hosted by the resource server 110 may be transmitted to the resource server 110, such as to the resource service 112 executed by the resource server 110. In some embodiments, the request to access resources 258 hosted by the resource server 110 may be transmitted to the management server 130, such as to the management server 132 executed by the management server 130.

In certain embodiments, the request for access to hosted resources 258 may be a general request for resources 258, which may seek access to resources 258 that the resource service 110 determines are appropriate. In some embodiments, the request for access to hosted resources 258 may be a specific request for resources 258, which may request access to specific resources 258 hosted by the resource server 110. In any case, the request may include a management identifier 256, specifying that the transmitter of the request is authorized to access the requested resources 258. Additionally or alternatively, the request may include a device profile 252 associated with the user device 150 and/or user data 254 associated with a user of the user device 150, which may be relied upon to determine whether the transmitter of the request satisfies certain compliance rules 260. Once the request for access to resources 258 hosted by the resource server 110 is transmitted, the stages of FIG. 9 may end.

Optionally then in stage 925, access to resources 258 hosted by the resource server 925 may be received. In certain embodiments, access to the resources 258 hosted by the resource server 925 may be received via a transmission of the resources 258 over the network 140, such as a transmission of the resources 258 by the resource service 112 executed by the resource server 110. In some embodiments, access to the resources 258 hosted by the resource server 925 may be received via an instruction specifying that the resources 258 should be downloaded from the resource server 110, such as an API call instructing an operating system to initiate a download of the resources 258 from the resource service 112 executed by the resource server 110. Once access to resources 258 hosted by the resource server 110 is received, the stages of FIG. 9 may end.

As described above, FIGS. 4, 5, 6, 7, 8 and 9 illustrate flowcharts of example apparatuses 300, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions.

In this regard, the computer program instructions which embody the procedures described above may be stored by a memory device 304 of an apparatus 300 employing an embodiment of the present invention and executed by a processor 302 of the apparatus 300. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. For example, in some embodiments, certain ones of the operations described above may be modified or enhanced. Furthermore, in some embodiments, additional optional operations may be included. Modifications, additions, or enhancements to the operations above may be performed in any order and in any combination.

Accordingly, different combinations of elements and/or functions than those explicitly described above are also contemplated as may be set forth in some of the appended claims. Although specific terms are employed herein, they are used in a generic and descriptive sense only and not for purposes of limitation.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method for authorizing access to a cloud-based content repository, comprising:
    receiving a management identifier that indicates a mobile device is being managed by a management service;
    transmitting an access request including the management identifier to the content repository;
    determining whether the mobile device can access the resource identifier based on validity of the management identifier and whether the mobile device is in compliance with a configuration profile from the management service, wherein the compliance is checked at the time of receiving the access request; and
    denying access to the content repository based on a determination that the mobile device is non-compliant with the configuration profile.

2. The method of claim 1, wherein the management identifier comprises a certificate.

3. The method of claim 1, wherein:
    transmitting the request further comprises transmitting, in addition to the management identifier, authentication credentials for accessing the content repository.

4. The method of claim 1, further comprising receiving access based on determining, for a second access request, that the mobile device complies with the configuration profile.

5. The method of claim 4, further comprising:
    determining a subset of content for which access should be granted based on the management identifier and evaluation of compliance with the configuration profile.

6. The method of claim 1, wherein the access request further comprises an address of a management server.

7. The method of claim 6, further comprising providing, from the content repository to the management server, the management identifier, wherein the management server determines the validity of the management identifier.

8. The method of claim 1, wherein receiving access to the content repository is preconditioned on bringing the mobile device into compliance with an encryption policy.

9. A computer-readable medium comprising instructions which, when executed by a processor, perform a method for authorizing access to a cloud-based content repository, comprising:
    receiving a management identifier that indicates a mobile device is being managed by a management service;
    transmitting an access request including the management identifier to the content repository;
    determining whether the mobile device can access the resource identifier based on validity of the management identifier and whether the mobile device is in compliance with a configuration profile received from the management service, wherein the compliance is checked at the time of receiving the access request; and
    denying access to the content repository based on a determination that the mobile device is non-compliant with the configuration profile.

10. The computer-readable medium of claim 9, wherein the management identifier comprises a certificate.

11. The computer-readable medium of claim 9, wherein transmitting the request further comprises transmitting, in addition to the management identifier, authentication credentials for accessing the content repository.

12. The computer-readable medium of claim 9, wherein the method further comprises receiving access based on determining, for a second access request, that the mobile device complies with the configuration profile.

13. The computer-readable medium of claim 9, wherein the method further comprises:
    determining a subset of content for which access should be granted based on the management identifier and evaluation of compliance with the configuration profile.

14. The computer-readable medium of claim 9, wherein:
    the access request further comprises an address of a management server, and
    the method further comprises providing, from the content repository to the management server, the management identifier, wherein the management server determines the validity of the management identifier.

15. The computer-readable medium of claim 9, wherein receiving access to the content repository is preconditioned on bringing the mobile device into compliance with an encryption policy.

16. A system for authorizing access to a cloud-based content repository, comprising:
    a mobile device;
    a content repository; and
    a management server, wherein
        the mobile device provides a request to access the cloud-based content repository, the request including a management identifier;
        the management server receives the management identifier from the cloud-based content repository,
        the management server determines whether the management identifier is valid and whether the mobile device is in compliance with a configuration profile received from the management service, wherein the compliance is checked at the time of receiving the access request, and
        the mobile device is denied access to the cloud-based content repository, based on a determination that the mobile device is non-compliant with a configuration profile from the management service.

17. The system of claim 16, wherein the management identifier comprises a certificate.

18. The system of claim 16, wherein:
    the mobile device further provides authentication credentials for accessing the cloud-based content repository, and the mobile device receives the access to the cloud-based content repository when the authentication credentials are validated.

19. The system of claim 16, wherein at least one of the management server or the mobile device further:
evaluates, upon generating the request, whether the mobile device complies with the configuration profile.

20. The system of claim 16, wherein:
the management server further determines a subset of content for which access should be granted based on the management identifier and evaluation of compliance with the configuration profile, and
the mobile devices receives access to the subset of content in the cloud-based content repository.

* * * * *